United States Patent
Mizuhashi et al.

(10) Patent No.: US 9,035,202 B2
(45) Date of Patent: May 19, 2015

(54) TOUCH DETECTING FUNCTION DISPLAY APPARATUS, DRIVING CIRCUIT, DRIVING METHOD OF TOUCH DETECTING FUNCTION DISPLAY APPARATUS AND ELECTRONIC EQUIPMENT

(75) Inventors: Hiroshi Mizuhashi, Kanagawa (JP);
Takayuki Nakanishi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 333 days.

(21) Appl. No.: 13/067,519

(22) Filed: Jun. 7, 2011

(65) Prior Publication Data
US 2012/0044166 A1 Feb. 23, 2012

(30) Foreign Application Priority Data
Aug. 23, 2010 (JP) ................. 2010-186198

(51) Int. Cl.
*G06F 3/044* (2006.01)
*G09G 3/36* (2006.01)
*G06F 3/041* (2006.01)

(52) U.S. Cl.
CPC ............ *G09G 3/3655* (2013.01); *G06F 3/0412* (2013.01); *G06F 3/044* (2013.01); *G09G 3/3614* (2013.01); *G09G 3/3677* (2013.01); *G09G 2300/0434* (2013.01); *G09G 2310/0286* (2013.01)

(58) Field of Classification Search
USPC ..................... 178/18.01–18.06; 345/173–178
See application file for complete search history.

(56) References Cited

U.S. PATENT DOCUMENTS 5,128,673 A * 7/1992 Tamamura et al. ........... 341/100
2001/0011979 A1 * 8/2001 Hasegawa et al. ............... 345/87
2008/0062140 A1 * 3/2008 Hotelling et al. ............. 345/173
2009/0256818 A1 * 10/2009 Noguchi et al. .............. 345/174

(Continued)

FOREIGN PATENT DOCUMENTS

| CN | 101644980 A | 2/2010 |
|---|---|---|
| JP | 2009-258182 | 11/2009 |

(Continued)

OTHER PUBLICATIONS

Japanese Office Action issued Oct. 22, 2013 for corresponding Japanese Application No. 2010-186198.
Chinese Office Action issued Dec. 31, 2014 for corresponding Chinese Application No. 201110242900.3.

*Primary Examiner* — Quan-Zhen Wang
*Assistant Examiner* — Chad Dicke
(74) *Attorney, Agent, or Firm* — Fishman Stewart Yamaguchi PLLC

(57) ABSTRACT

A touch detecting function display apparatus includes a plurality of common driving electrodes, a display element performing display, a touch detection element detecting an external approaching object, and a scanning driving unit performing first scanning driving for sequentially applying a display driving signal to the plurality of common driving electrodes in a time division manner and second scanning driving for sequentially applying a touch detection driving signal to the plurality of common driving electrodes in a time division manner, wherein the scanning driving unit performs the second scanning driving at a scanning speed higher than that of the first scanning driving, and applies the display driving signal to an overlapping common driving electrode when the common driving electrode selected as a target of the first scanning driving overlaps with the common driving electrode selected as a target of the second scanning driving.

9 Claims, 30 Drawing Sheets

(56) References Cited

U.S. PATENT DOCUMENTS

2010/0289758 A1* 11/2010 Matsubara ................ 345/173
2011/0267305 A1* 11/2011 Shahparnia et al. .......... 345/174

FOREIGN PATENT DOCUMENTS

| JP | 2009-540374 A | 11/2009 |
| WO | WO-2007/146785 A2 | 12/2007 |

* cited by examiner

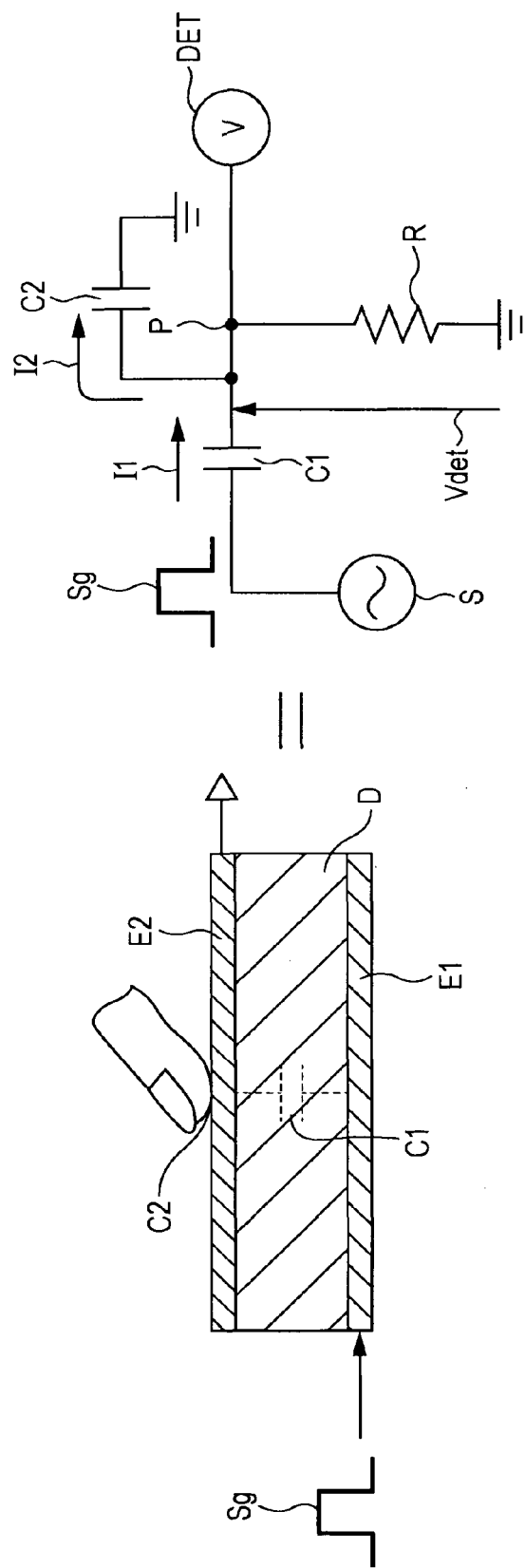

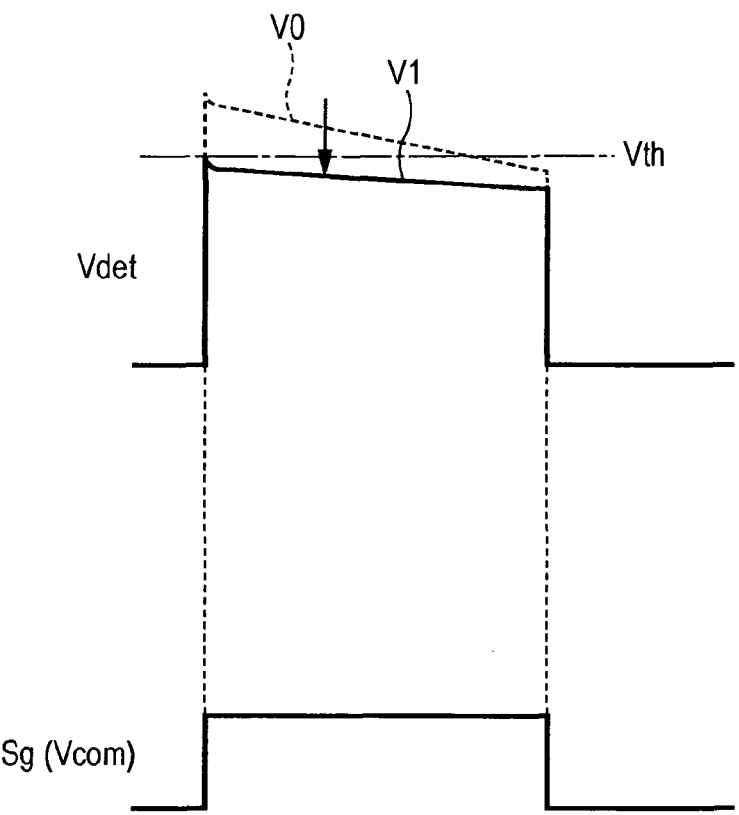

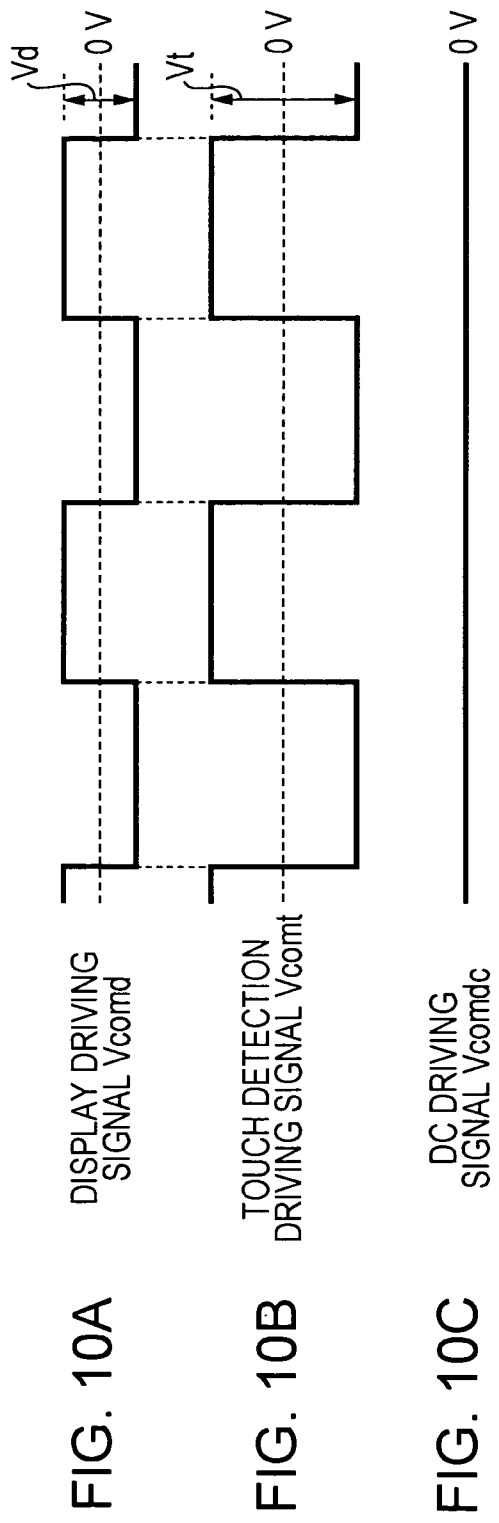

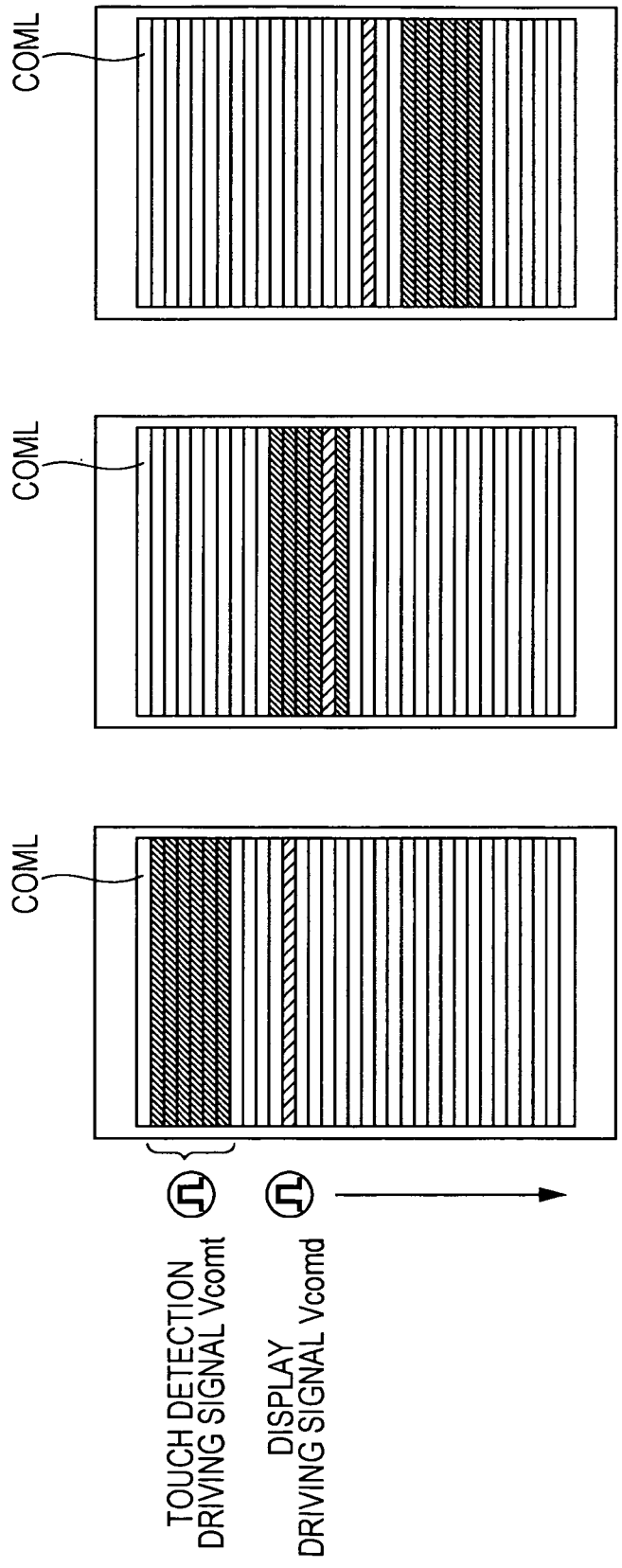

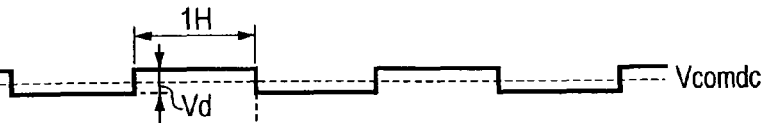
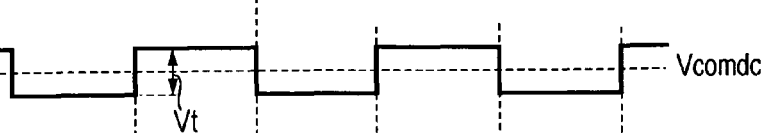
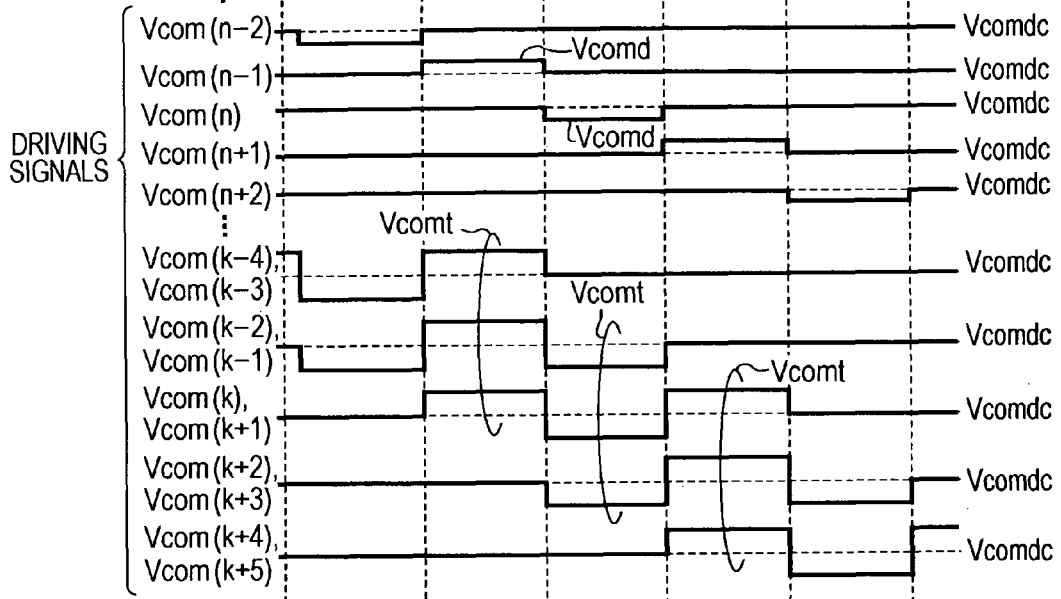
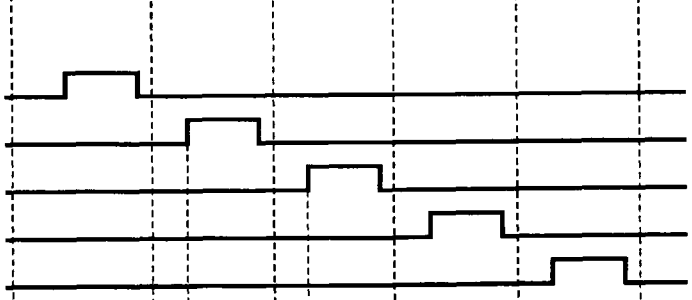
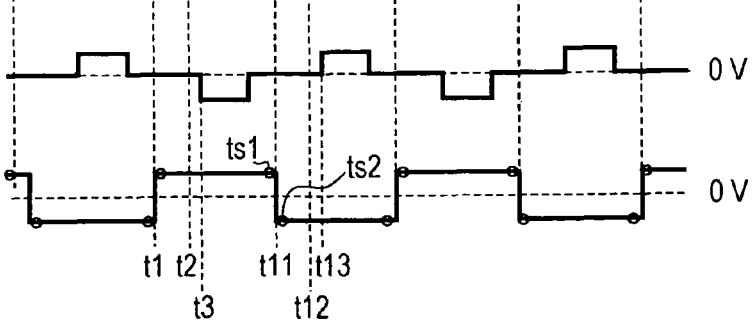

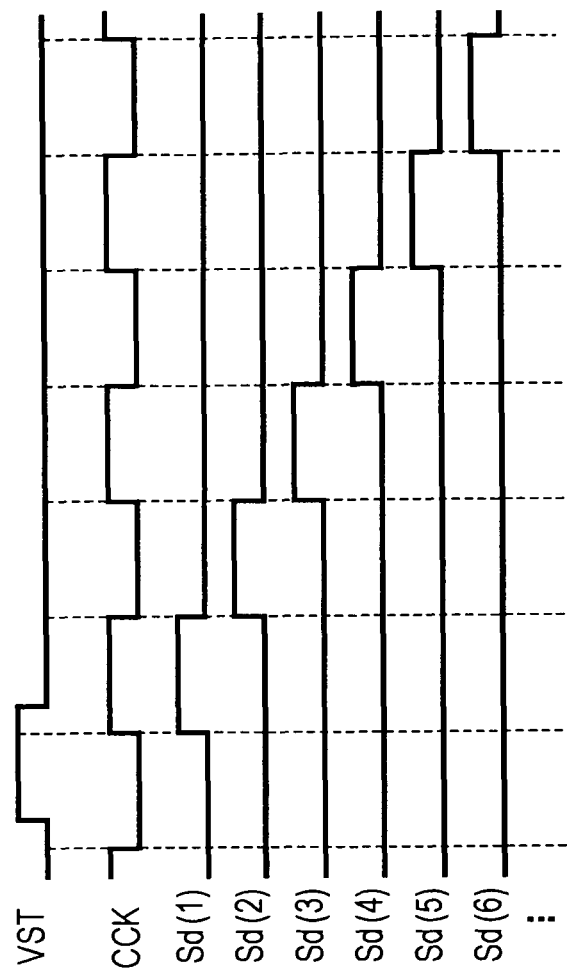

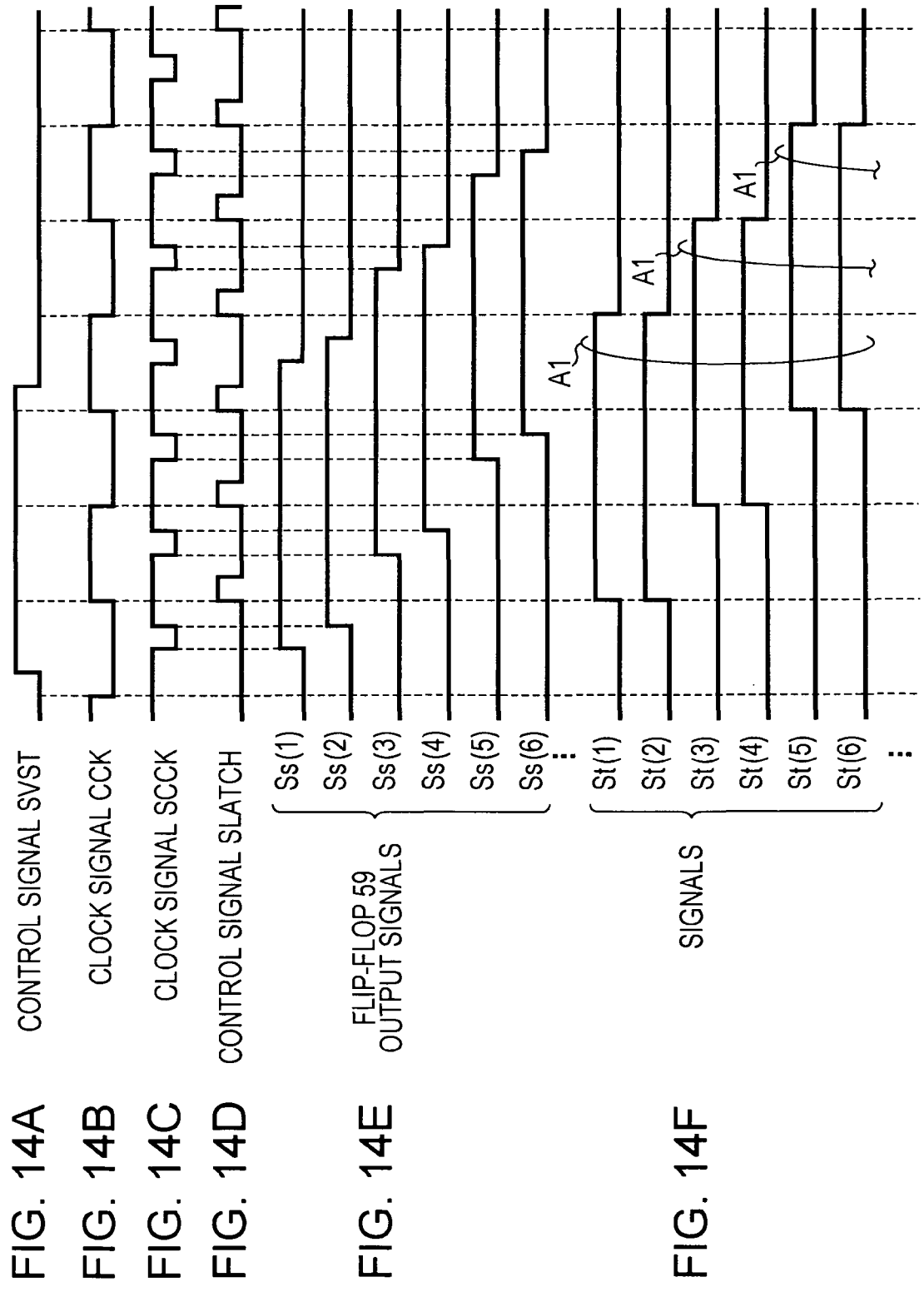

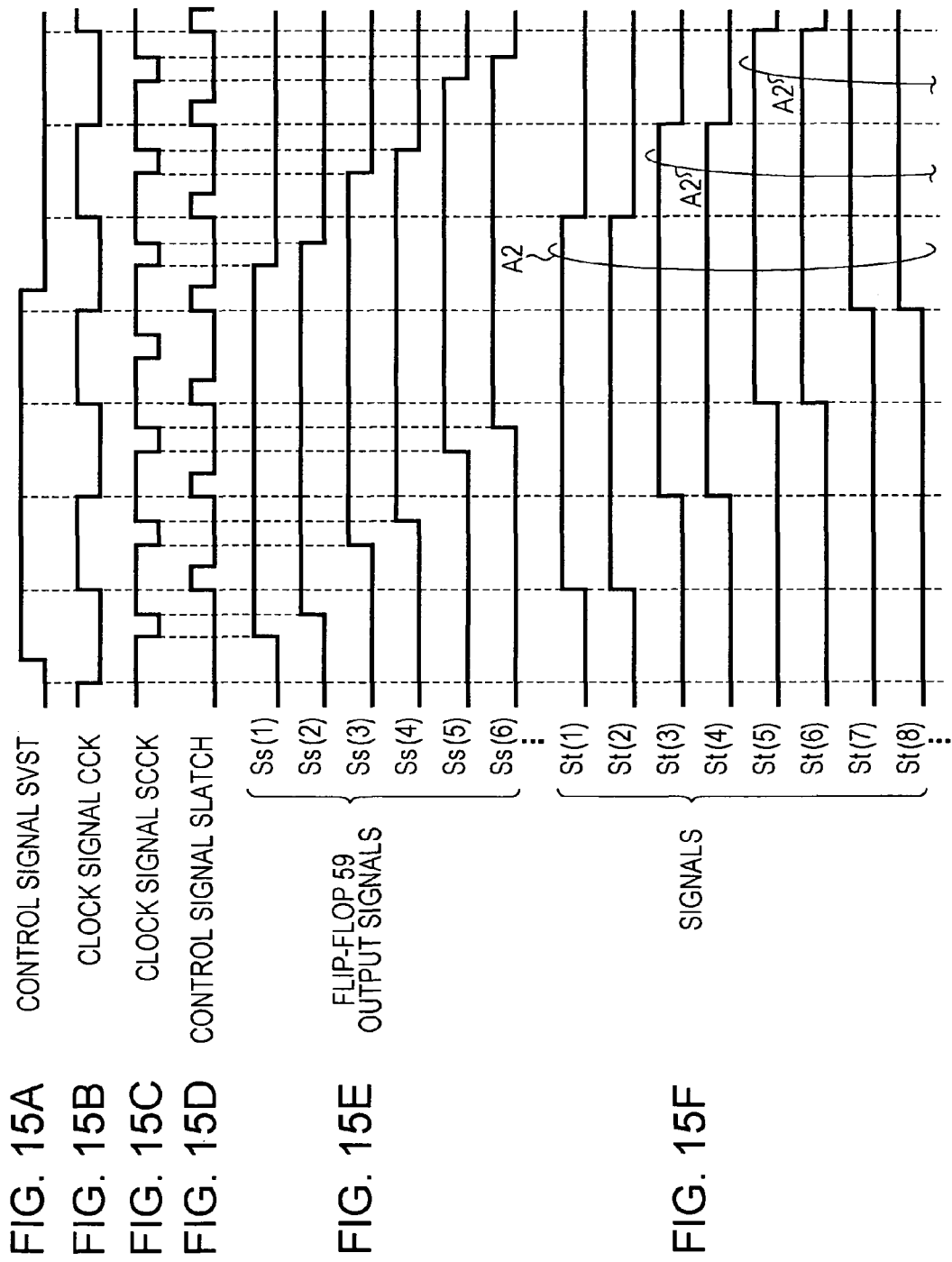

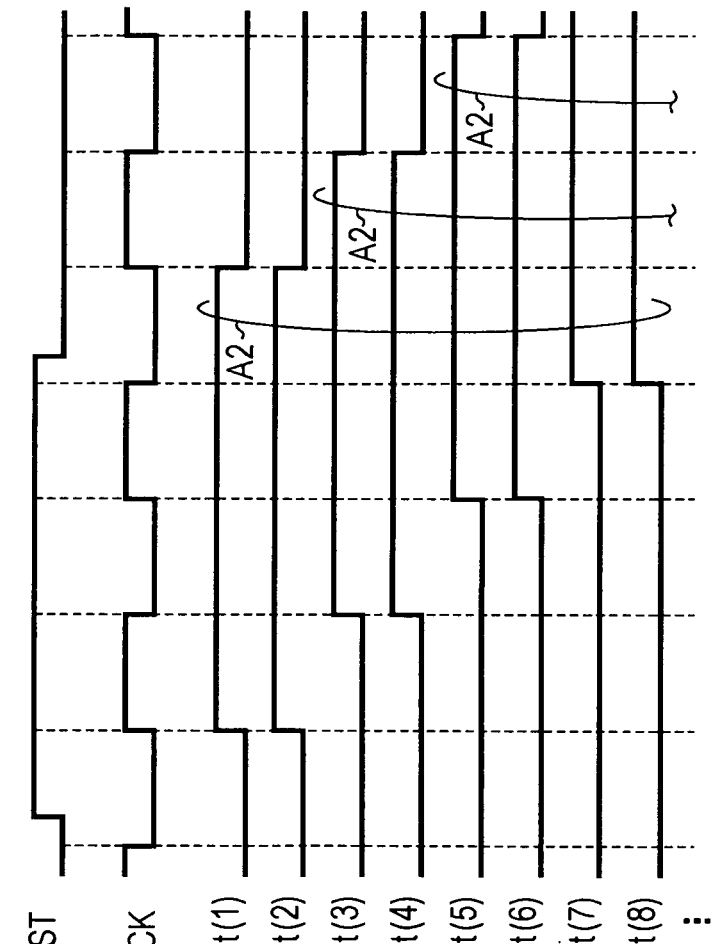

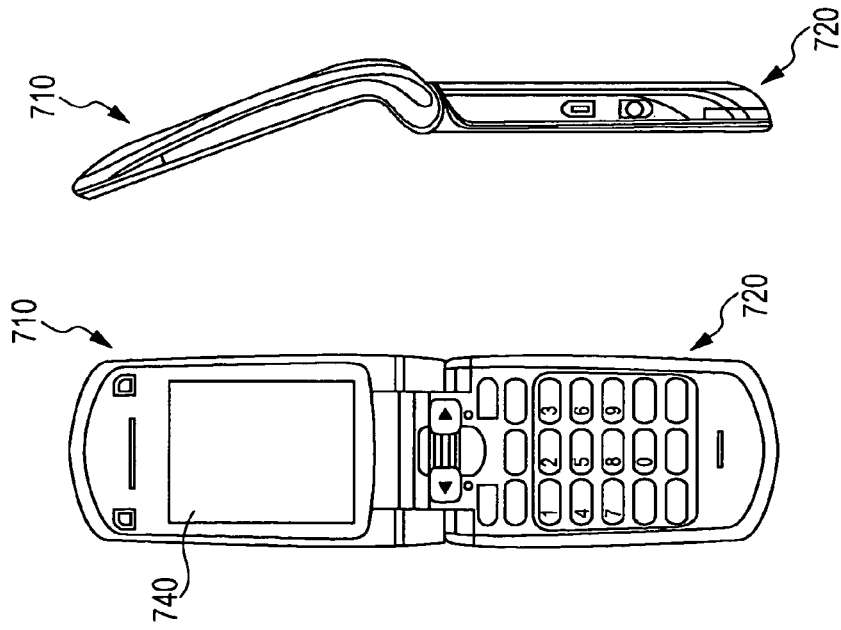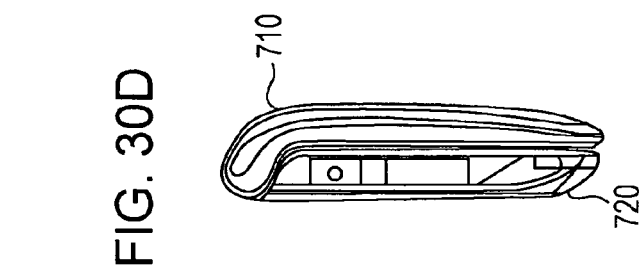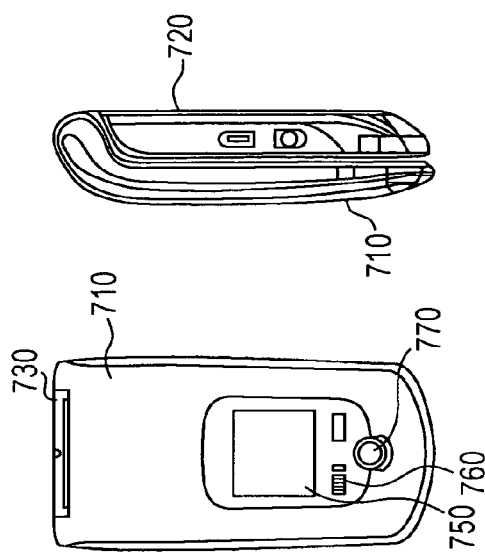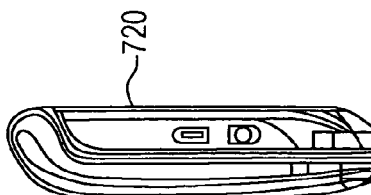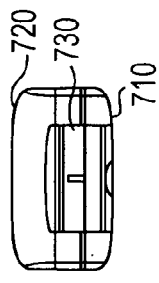

TOUCH DETECTING FUNCTION DISPLAY APPARATUS, DRIVING CIRCUIT, DRIVING METHOD OF TOUCH DETECTING FUNCTION DISPLAY APPARATUS AND ELECTRONIC EQUIPMENT

BACKGROUND

The present disclosure relates to a display apparatus capable of detecting an external approaching object, and more particularly to a touch detecting function display apparatus, a driving circuit, a driving method of the touch detecting function display apparatus, and electronic equipment including the same, capable of detecting a touch based on variations in capacitance.

In recent years, a display apparatus has attracted attention in which a display device such as a liquid crystal display device mounts a touch detecting function of detecting an external approaching object such as a finger therein, and information can be input instead of typical mechanical buttons by displaying various kinds of button images on the display device. Such a display apparatus with the touch detecting function tends to expand its use to a portable information terminal in the manner of a mobile phone and the like in addition to a computer, since an input device such as a keyboard, a mouse, or a keypad is not necessary.

The touch detection scheme includes several types, one of which is a capacitance type. For example, Japanese Unexamined Patent Application Publication No. 2009-258182 has proposed a display apparatus in which a common electrode for display originally provided in a display device is commonly used as one of a pair of electrodes for a touch sensor, and the other electrode (touch detection electrode) is disposed to intersect the common electrode. A capacitor is formed between the common electrode and the touch detection electrode, and the capacitance thereof is varied according to an external approaching object. The display apparatus, using this, analyzes a touch detection signal appearing at the touch detection electrode when a driving signal for touch detection is applied to the common electrode and detects the external approaching object. The display apparatus performs a display operation by sequentially applying the driving signal to the common electrode so as to perform line sequential scanning, and performs a touch detection operation by analyzing the touch detection signal appearing at the touch detecting electrode in response to the driving signal. At this time, by applying the driving signal to a plurality of common electrodes, improvement in the S/N ratio of the touch detection, that is, improvement in detection sensitivity of the touch detection is realized.

SUMMARY

Generally, however, in the touch detection, a rapid response to a touch operation is preferable. In order to realize the rapid response, for example, a frequency for detecting the touch operation may be increased by increasing the scanning speed in the touch detection operation. However, in the display apparatus disclosed in Japanese Unexamined Patent Application Publication No. 2009-258182, since the driving signal is commonly used in the display operation and the touch detection operation, the scanning speed is necessarily the same and is thus difficult to increase. Thereby, there is a case where a user feels discomfort in the touch detection.

It is desirable to provide a touch detecting function display apparatus, a driving circuit, a driving method of the touch detecting function display apparatus, and electronic equipment, capable of increasing the response speed to a touch operation.

A touch detecting function display apparatus according to an embodiment of the present disclosure includes a plurality of common driving electrodes, a display element, a touch detection element, and a scanning driving unit. The plurality of common driving electrodes is disposed in parallel so as to extend in one direction. The display element performs display based on a pixel signal and a display driving signal. The touch detection element detects an external approaching object based on a touch detection driving signal. The scanning driving unit performs first scanning driving for sequentially applying the display driving signal to the plurality of common driving electrodes in a time division manner and second scanning driving for sequentially applying the touch detection driving signal to the plurality of common driving electrodes in a time division manner. The scanning driving unit performs the second scanning driving at a scanning speed higher than that of the first scanning driving, and applies the display driving signal to an overlapping common driving electrode when the common driving electrode selected as a target of the first scanning driving overlaps with the common driving electrode selected as a target of the second scanning driving.

A driving circuit according to another embodiment of the present disclosure includes a scanning driving unit. The scanning driving unit performs first scanning driving for sequentially applying a display driving signal to a plurality of common driving electrodes in a time division manner and second scanning driving for sequentially applying a touch detection driving signal to the plurality of common driving electrodes in a time division manner, for a touch detecting function display unit that includes the plurality of common driving electrodes disposed in parallel so as to extend in one direction; a display element performing a display based on a pixel signal and the display driving signal; and a touch detection element detecting an external approaching object based on the touch detection driving signal. The scanning driving unit performs the second scanning driving at a scanning speed higher than that of the first scanning driving, and applies the display driving signal to an overlapping common driving electrode when the common driving electrode selected as a target of the first scanning driving overlaps with the common driving electrode selected as a target of the second scanning driving.

A driving method of a touch detecting function display apparatus according to still another embodiment of the present disclosure includes performing first scanning driving for display based on a pixel signal and a display driving signal by sequentially applying the display driving signal to a plurality of common driving electrodes which are disposed in parallel so as to extend in one direction in a time division manner and sequentially applying the pixel signal to pixel electrodes corresponding to the common driving electrode to which the display driving signal is applied in synchronization with the application of the display driving signal in a time division manner; performing second scanning driving for sequentially applying a touch detection driving signal used to detect an external approaching object to the plurality of common driving electrodes at a scanning speed higher than that of the first scanning driving in a time division manner; and applying the display driving signal to an overlapping common driving electrode when the common driving electrodes selected as a target of the first scanning driving overlaps with the common driving electrode selected as a target of the second scanning driving.

Electronic equipment according to still another embodiment of the present disclosure includes the touch detecting function display apparatus and corresponds to, for example, a television set, a digital camera, a personal computer, a video camera, a portable terminal device such as a mobile phone, or the like.

In the touch detecting function display apparatus, the driving circuit, the driving method of the touch detecting function display apparatus, and the electronic device according to the embodiments of the present disclosure, during the display operation, the display driving signal is sequentially applied to the common driving electrodes as the first scanning driving, and, during the touch detection operation, the touch detection driving signal different from the display driving signal is sequentially applied to the common driving electrodes as the second scanning driving. At this time, the second scanning driving is performed at a scanning speed higher than that of the first scanning driving, and thus the touch detection scanning is performed faster than the display scanning.

In the touch detecting function display apparatus according to the embodiment of the present disclosure, for example, the display driving signal may be a rectangular wave signal. In addition, it is preferable that the second scanning driving is operated based on a basic operation clock having the same frequency as a basic operation clock of the first scanning driving, and, during the second scanning driving, the scanning driving unit performs the scanning so as to simultaneously select a plurality of common driving electrodes as targets of the scanning driving and shifts the selected common driving electrodes by two or more at timings corresponding to level transitions of the display driving signal.

For example, the scanning driving unit may include a shift register unit that performs the second scanning driving; and a scanning control unit that controls the shift register unit, and the shift register unit preferably performs serial parallel conversion for a control signal which has a pulse width corresponding to the plurality and is supplied from the scanning control unit, thereby selecting a plurality of common driving electrodes which are targets of the second scanning driving.

The serial parallel conversion may be performed based on a clock signal which has two or more transitions during a period corresponding to a scanning pitch. In this case, the scanning driving unit may further include a timing adjustment unit that outputs each of parallel output signals generated through the serial parallel conversion at a timing corresponding to a start timing of the period corresponding to the scanning pitch.

Further, for example, the scanning driving unit may further include a division unit which divides each of the parallel output signals generated through the serial parallel conversion into two or more signals, and the shift register unit may perform the serial parallel conversion based on the clock signal, and the division unit may divide the parallel output signal, thereby selecting a plurality of common driving electrodes which are targets of the second scanning driving.

In addition, for example, the touch detection driving signal may be a rectangular wave signal having amplitude larger than that of the display driving signal.

In the touch detecting function display apparatus, the driving circuit, the driving method of the touch detecting function display apparatus, and the electronic equipment according to the embodiments of the present disclosure, during the second scanning driving, the second scanning driving is performed at a scanning speed higher than that of the first scanning driving using the touch detection driving signal different from the display driving signal, and thus it is possible to increase a response speed to a touch operation.

BRIEF DESCRIPTION OF THE DRAWINGS

FIGS. 2A and 2B are diagrams illustrating a fundamental principle of the touch detection scheme in the touch detecting function display apparatus according to an embodiment of the present disclosure, and show a state where a finger contacts or approaches.

FIGS. 3A and 3B are diagrams illustrating a fundamental principle of the touch detection scheme in the touch detecting function display apparatus according to an embodiment of the present disclosure, and are diagrams illustrating a waveform example of a driving signal and a touch detection signal.

FIGS. 10A to 10C are waveform diagrams illustrating an example of a display driving signal, a touch detection driving signal, and a DC driving signal according to the first embodiment.

FIGS. 11A to 11C are schematic diagrams illustrating an operation example of the scanning driving unit according to the first embodiment.

FIGS. 12A to 12F are timing waveform diagrams illustrating an operation example of the touch detecting function display apparatus according to the first embodiment.

FIGS. 13A to 13C are timing waveform diagrams illustrating an operation example of the display scanning unit according to the first embodiment.

FIGS. 14A to 14F are timing waveform diagrams illustrating an operation example of the touch detection scanning unit according to the first embodiment.

FIGS. 15A to 15F are timing waveform diagrams illustrating another operation example of the touch detection scanning unit according to the first embodiment.

FIGS. 25A to 25C are timing waveform diagrams illustrating another operation example of the touch detection scanning unit according to the second embodiment.

FIGS. 30A to 30G are a front view, a side view, a top view and a bottom view illustrating an exterior configuration of an application example 5.

DETAILED DESCRIPTION OF EMBODIMENTS

Figure 1A:
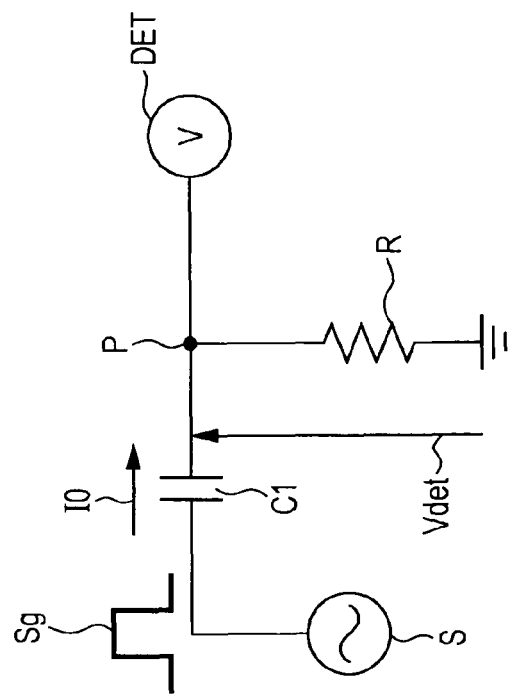
FIGS. 1A and 1B are diagrams illustrating a fundamental principle of a touch detection scheme in a touch detecting function display apparatus according to an embodiment of the present disclosure, and show a state where a finger does not contact or approach.

Hereinafter, embodiments of the present disclosure will be described in detail with reference to the accompanying drawings. The description will be made in the following order.
1. Fundamental Principles of Capacitance Type Touch Detection
2. First Embodiment
3. Second Embodiment
4. Application Examples
1. Fundamental Principles of Capacitance Type Touch Detection First, the fundamental principles of touch detection in a touch detecting function display apparatus according to an embodiment of the present disclosure will be described with reference to FIGS. 1A to 3B. The touch detection scheme is realized by a capacitance type touch sensor, and, for example, a capacitive element is formed using a pair of electrodes (a driving electrode E1 and a touch detection electrode E2) which are disposed opposite to each other with a dielectric body D interposed therebetween, as shown in FIG. 1A. This structure is shown as an equivalent circuit shown in FIG. 1B. The driving electrode E1, the touch detection electrode E2, and the dielectric body D form a capacitive element C1. The capacitive element C1 has one end which is connected to an AC signal source (driving signal source) S and the other end P which is connected to the ground via a resistor R, and a voltage detector (touch detection circuit) DET. When an AC rectangular wave Sg (FIG. 3B) having a predetermined frequency (for example, about several kHz to several tens of kHz) is applied to the driving electrode E1 (one end of the capacitive element C1) from the AC signal source S, an output waveform (touch detection signal Vdet) as shown in FIG. 3A appears at the touch detection electrode E2 (the other end P of the capacitive element C1). The AC rectangular wave Sg corresponds to a touch detection driving signal Vcomt described later.

Figure 1B:
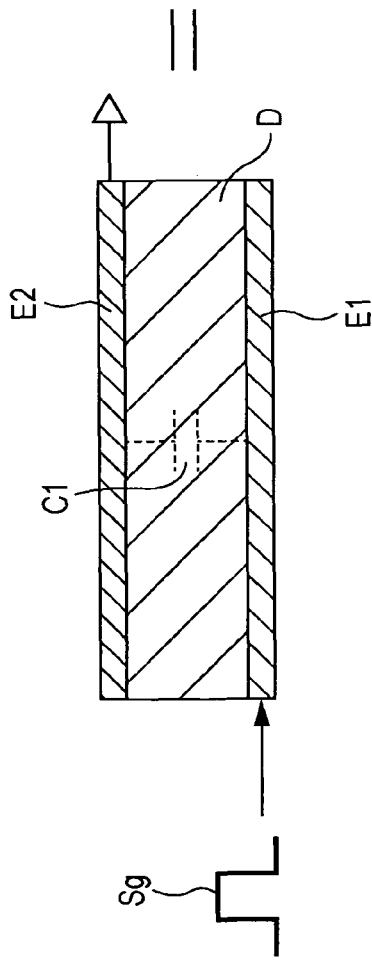

In a state where a finger does not contact (or approach), as shown in FIGS. 1A and 1B, a current I0 corresponding to a capacitance value of the capacitive element C1 flows according to the charging and discharging of the capacitive element C1. A waveform of a potential at the other end P of the capacitive element C1 at this time gives, for example, the waveform V0 as shown in FIG. 3A, which is detected by the voltage detector DET.

On the other hand, in a state where a finger contacts (or approaches), as shown in FIGS. 2A and 2B, a capacitive element C2 formed by the finger is connected in series to the capacitive element C1. In this state, currents I1 and I2 are respectively applied according to the charging and discharging of the capacitive elements C1 and C2. A waveform of a potential at the other end P of the capacitive element C1 at this time gives, for example, the V1 as shown in FIG. 3A, which is detected by the voltage detector DET. At this time, the potential at the point P becomes a divided potential which is defined by the values of the currents I1 and I2 which are applied through the capacitive elements C1 and C2. For this reason, the waveform V1 has a value smaller than the waveform V0 in the non-contact state. The voltage detector DET compares the detected voltage with a predetermined threshold value voltage Vth, if the detected voltage is equal to or more than the threshold value voltage, determines the non-contact state, and, if smaller than the threshold value voltage, determines the contact state. In this way, the touch detection can be performed.

2. First Embodiment: Configuration Example (Overall Configuration Example)

Figure 4:
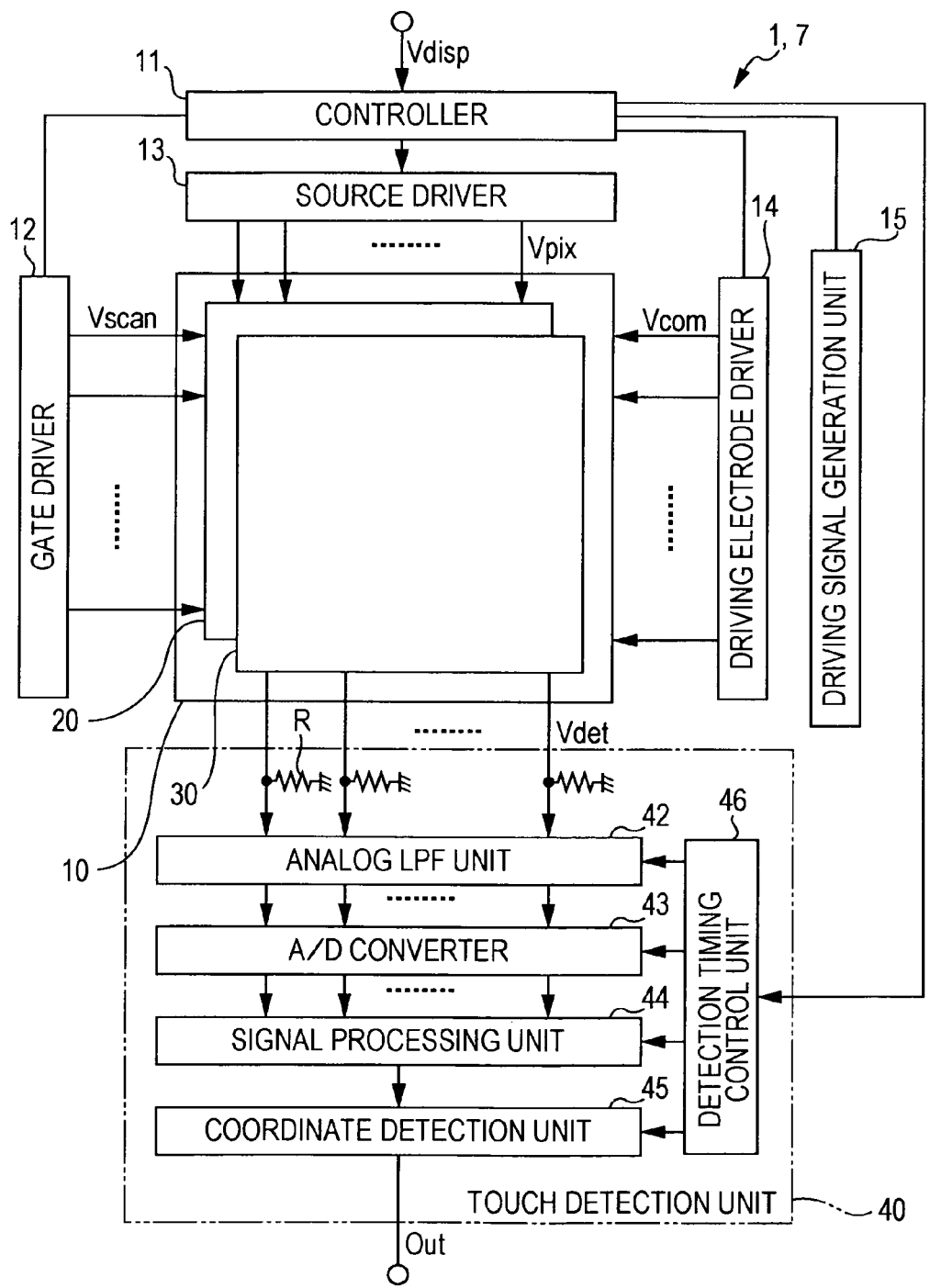
FIG. 4 is a block diagram illustrating a configuration example of a touch detecting function display apparatus according to an embodiment of the present disclosure.

FIG. 4 shows a configuration example of a touch detecting function display apparatus according to a first embodiment of the present disclosure. In addition, a driving circuit and a driving method of the touch detecting function display apparatus according to the embodiment of the present disclosure are realized by this embodiment, and thus the description thereof will be described together. The touch detecting function display apparatus uses a liquid crystal display element as a display element, and is a so-called in-cell type device which integrates a liquid crystal display device formed by the liquid crystal display element with a capacitance type touch detection device.

The touch detecting function display apparatus 1 includes a controller 11, a gate driver 12, a source driver 13, a driving signal generation unit 15, a driving electrode driver 14, a touch detecting function display device 10, and a touch detection unit 40.

The controller 11 supplies control signals to the gate driver 12, the source driver 13, the driving signal generation unit 15, the driving electrode driver 14, and the touch detection unit 40 based on a video signal Vdisp supplied from an external device, and controls them so as to be operated in synchronization with each other.

The gate driver 12 sequentially selects one horizontal line which is a target of the display driving in the touch detecting function display device 10 based on the control signals supplied from the controller 11. Specifically, the gate driver 12 applies, as described later, a scanning signal Vscan to a gate of a TFT element Tr of a pixel Pix via a scanning signal line GCL, and thus sequentially selects one row of the pixels Pix (one horizontal line) which are formed in a matrix on a liquid crystal display device 20 of the touch detecting function display device 10, as a target of the display driving.

The source driver 13 supplies a pixel signal Vpix to each pixel Pix (described later) of the touch detecting function display device 10 based on the control signals supplied from the controller 11. Specifically, the source driver 13 supplies the pixel signal Vpix to each of the pixels Pix respectively forming the one horizontal line, which are sequentially selected by the gate driver 12, via pixel signal lines SGL, as described later.

The driving signal generation unit 15 generates a driving signal Vcom based on the control signals supplied from the controller 11. Specifically, the driving signal generation unit 15, as described later, generates a display driving signal Vcomd for the display operation, and a touch detection driving signal Vcomt for the touch detection operation, and supplies the generated signals to the driving electrode driver 14 described later.

The driving electrode driver 14 supplies the driving signal Vcom supplied from the driving signal generation unit 15 to driving electrodes COML (described later) of the touch detecting function display device 10 based on the control signals supplied from the controller 11. Specifically, the driving electrode driver 14 sequentially applies the display driving signal Vcomd and the touch detection driving signal Vcomt to the driving electrodes COML in a time division manner.

The gate driver 12 and the driving electrode driver 14 form a scanning driving unit 50. A configuration of the scanning driving unit 50 will be described later in detail.

The touch detecting function display device 10 is a display device which embeds the touch detecting function therein. The touch detecting function display device 10 includes a liquid crystal display device 20 and a touch detection device 30. The liquid crystal display device 20 scans the horizontal lines one by one and performs display in response to the scanning signal Vscan supplied from the gate driver 12 and the display driving signal Vcomd supplied from the driving electrode driver 14. The touch detection device 30 is operated based on the fundamental principles of the above-described capacitance type touch detection, and outputs a touch detection signal Vdet in response to the touch detection driving signal Vcomt supplied from the driving electrode driver 14.

The touch detection unit 40 detects whether or not the touch detection device 30 is touched based on the control signals supplied from the controller 11 and the touch detection signal Vdet supplied from the touch detection device 30 of the touch detecting function display device 10, and, obtains coordinates for a touch detection region if the touch is performed. The touch detection unit 40 includes an analog LPF (Low Pass Filter) unit 42, an A/D converter 43, a signal processing unit 44, a coordinate extraction unit 45, and a detection timing control unit 46. The analog LPF unit 42 is a low-pass analog filter which removes the high frequency component (noise component) included in the touch detection signal Vdet supplied from the touch detection device 30, and extracts the touch component therefrom so as to be output. A resistor R for giving the DC potential (0 V) is connected between the input terminal of the analog LPF unit 42 and each ground. In addition, instead of the resistor R, for example, a switch may be provided, and the DC potential (0 V) may be given by turning on the switch at a predetermined timing. The A/D converter 43 is a circuit which converts the analog signal output from the analog LPF unit 42 into a digital signal. The signal processing unit 44 is a logic circuit which detects whether or not the touch detection device 30 is touched based on the output signal from the A/D converter 43. The coordinate extraction unit 45 is a logic circuit which obtains coordinates for the touched panel when the touch is detected by the signal processing unit 44. The detection timing control unit 46 controls the above-described circuits so as to be operated in synchronization with each other.

Touch Detecting Function Display Device 10

Next, a configuration example of the touch detecting function display device 10 will be described in detail.

Figure 5:
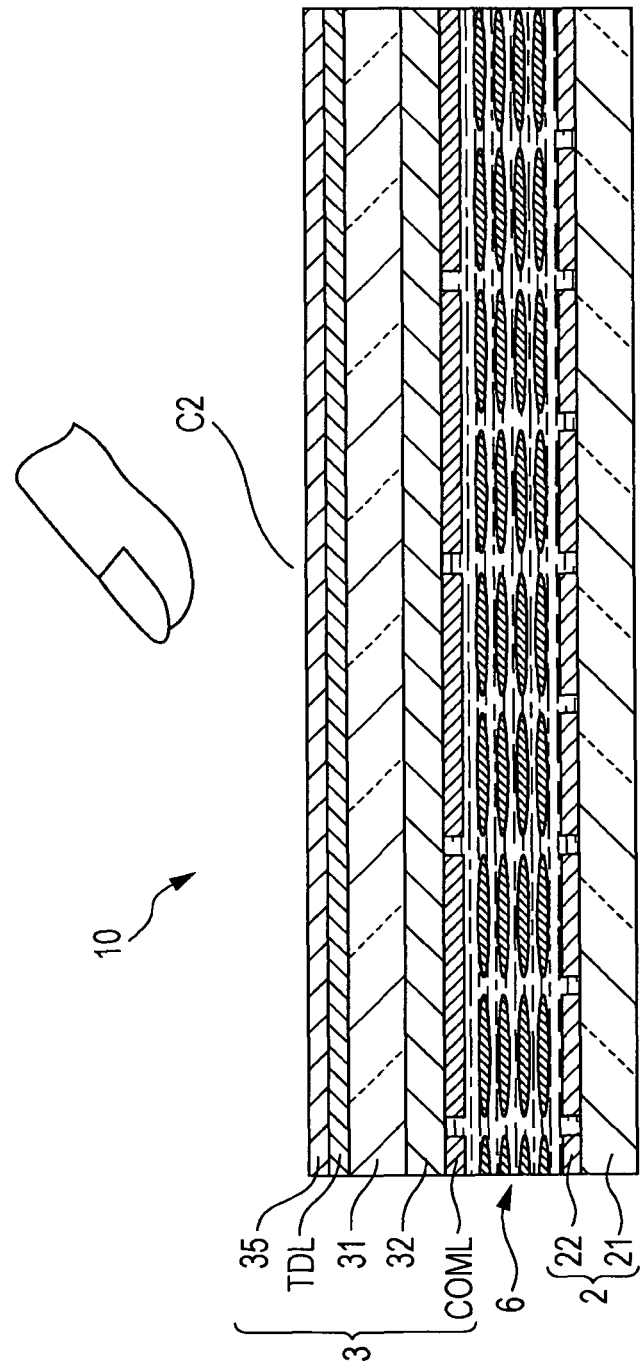
FIG. 5 is a cross-sectional view illustrating a schematic cross-sectional structure of a touch detecting function display device according to a first embodiment of the present disclosure.

FIG. 5 shows an example of a cross-sectional structure of main parts of the touch detecting function display device 10. The touch detecting function display device 10 includes a pixel substrate 2, an opposite substrate 3 which is disposed opposite to the pixel substrate 2, and a liquid crystal layer 6 which is interposed between the pixel substrate 2 and the opposite substrate 3.

The pixel substrate 2 has a TFT substrate 21 as a circuit substrate, and a plurality of pixel electrodes 22 disposed in a matrix on the TFT substrate 21. Although not shown, the TFT substrate 21 is provided with a thin film transistor (TFT) of each pixel, and lines such as pixel signal lines SGL which supply the pixel signal Vpix to the respective pixel electrodes 22, and scanning signal lines GCL which drive the respective TFTs.

The opposite substrate 3 has a glass substrate 31, a color filter 32 which is formed on one surface of the glass substrate 31, and a plurality of driving electrodes COML formed on the color filter 32. The color filter 32 is formed by periodically arranging color filter layers of, for example, three colors of red (R), green (G), and blue (B), and the three colors of R, G and B are correlated with each display pixel as one set. The driving electrodes COML function as common driving electrodes of the liquid crystal display device 20 and also function as driving electrodes of the touch detection device 30. The driving electrodes COML are connected to the pixel substrate 2 via contact conductive columns (not shown), and the driving signal Vcom (the display driving signal Vcomd and the touch detection driving signal Vcomt) with an AC rectangular wave is applied from the pixel substrate 2 to the driving electrodes COML via the contact conductive columns. Touch detection electrodes TDL which are detection electrodes of the touch detection device 30 are formed on the other surface of the glass substrate 31, and a polarizer 35 is disposed on the touch detection electrodes TDL.

The liquid crystal layer 6 modulates light passing therethrough according to an electric field state, and uses liquid crystal of various kinds of modes such as, for example, TN (twisted nematic), VA (vertical alignment), and ECB (electrically controlled birefringence).

In addition, alignment layers are respectively disposed between the liquid crystal layer 6 and the pixel substrate 2 and between the liquid crystal layer 6 and the opposite substrate 3, and, an incident side polarizer is disposed on the lower surface of the pixel substrate 2 but is not shown here.

Figure 6:
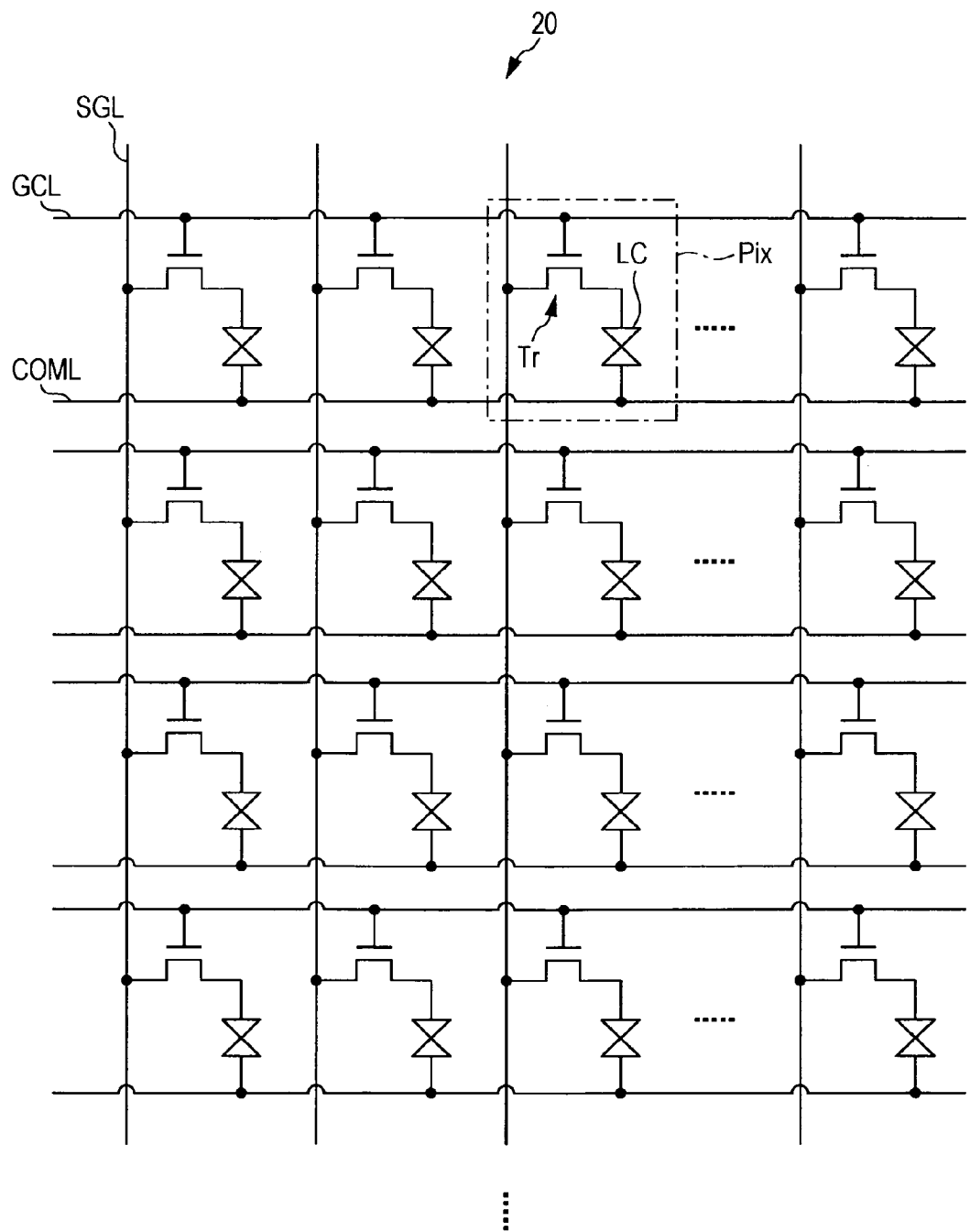
FIG. 6 is a circuit diagram illustrating a pixel arrangement of the touch detecting function display device according to the first embodiment.

FIG. 6 shows a configuration example of the pixel structure of the liquid crystal display device 20. The liquid crystal display device 20 includes a plurality of pixels Pix arranged in a matrix. Each pixel Pix has a TFT element Tr, and a liquid crystal element LC. The TFT element Tr is formed by a thin film transistor, and, in this example, is formed by an n channel MOS (Metal Oxide Semiconductor) type TFT. The TFT element Tr has a source connected to the pixel signal line SGL, a gate connected to the scanning signal line GCL, and a drain connected to one end of the liquid crystal element LC. The liquid crystal element LC has one end connected to the drain of the TFT element Tr and the other end connected to the driving electrode COML.

The pixels Pix are mutually connected to other pixels Pix belonging to the same row of the liquid crystal display device 20 via the scanning signal lines GCL. The scanning signal lines GCL are connected to the gate driver 12, and are supplied with the scanning signal Vscan from the gate driver 12. The pixels Pix are mutually connected to other pixels Pix belonging to the same column of the liquid crystal display device 20 via the pixel signal lines SGL. The pixel signal lines SGL are connected to the source driver 13, and are supplied with the pixel signal Vpix from the source driver 13.

In addition, the pixels Pix are mutually connected to other pixels Pix belonging to the same row of the liquid crystal display device 20 via the driving electrodes COML. The driving electrodes COML are connected to the driving electrode driver 14, and are supplied with the driving signal Vcom from the driving electrode driver 14.

By this configuration, in the liquid crystal display device 20, the gate driver 12 drives the scanning signal lines GCL so as to be scanned one by one in a time division manner, and thereby one horizontal line is sequentially selected. Therefore, the source driver 13 supplies the pixel signal Vpix to the pixels Pix belonging to the one horizontal line, and thereby a display is performed for each horizontal line. When the display operation is performed, the driving electrode driver 14 applies the display driving signal Vcomd to the driving electrode COML corresponding to the one horizontal line.

Figure 7:
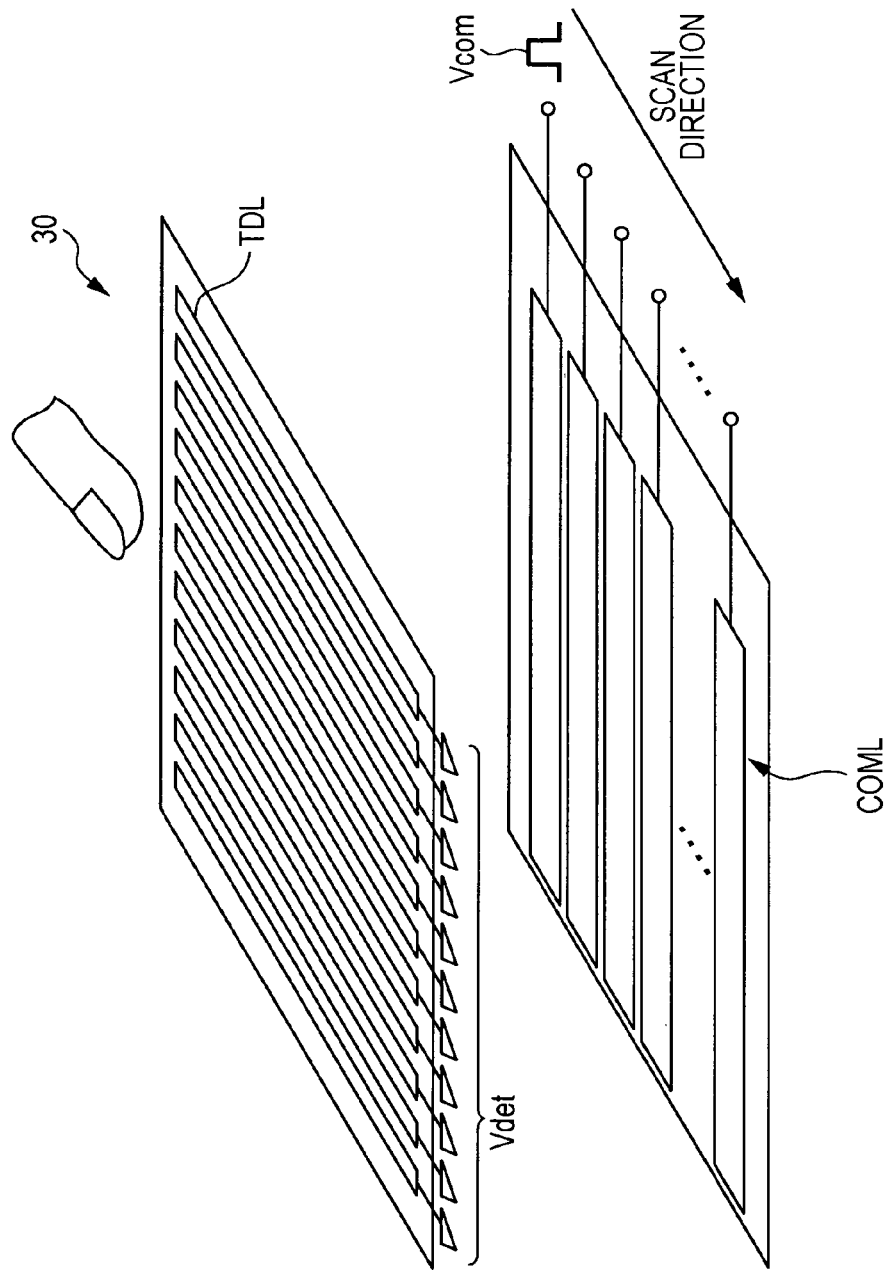
FIG. 7 is a perspective view illustrating a configuration example of driving electrodes and touch detection electrodes of the touch detecting function display device according to the first embodiment.

FIG. 7 is a perspective view illustrating a configuration example of the touch detection device 30. The touch detection device 30 includes the driving electrodes COML and the touch detection electrodes TDL disposed on the opposite substrate 3. The driving electrodes COML have a plurality (N) of stripe-shaped electrode patterns extending in the horizontal direction of the figure. When the touch detection operation is performed, the touch detection driving signal Vcomt is sequentially supplied to the respective electrode patterns from the driving electrode driver 14 for scanning driving. The touch detection electrodes TDL have stripe-shaped electrode patterns extending in a direction orthogonal to the extending direction of the electrode patterns of the driving electrodes COML. The respective electrode patterns of the touch detection electrodes TDL are connected to the input of the analog LPF unit 42 of the touch detection unit 40. The electrode patterns of the driving electrodes COML and the touch detection electrodes TDL which intersect each other form capacitors at the intersections.

By this configuration, when the touch detection operation is performed, in the touch detection device 30, the driving electrode driver 14 drives the driving electrodes COML so as to be scanned one by one in a time division manner, and the touch detection signal Vdet is output from the touch detection electrodes TDL, thereby performing the touch detection. In other words, each of the driving electrodes COML corresponds to the driving electrode E1 in the fundamental principles of the touch detection shown in FIGS. 1A to 3B, each of the touch detection electrodes TDL corresponds to the touch detection electrode E2, and thus the touch detection device 30 detects a touch according to the fundamental principles. As shown in FIG. 7, the electrode patterns intersecting each other form the capacitance type touch sensors in a matrix. Therefore, the scanning is performed for the overall touch detection surface of the touch detection device 30, and thereby it is possible to detect a position where an external approaching object contacts or approaches.

Scanning Driving Unit 50

Next, a configuration example of the scanning driving unit 50 formed by the gate driver 12 and the driving electrode driver 14 will be described in detail.

Figure 8:
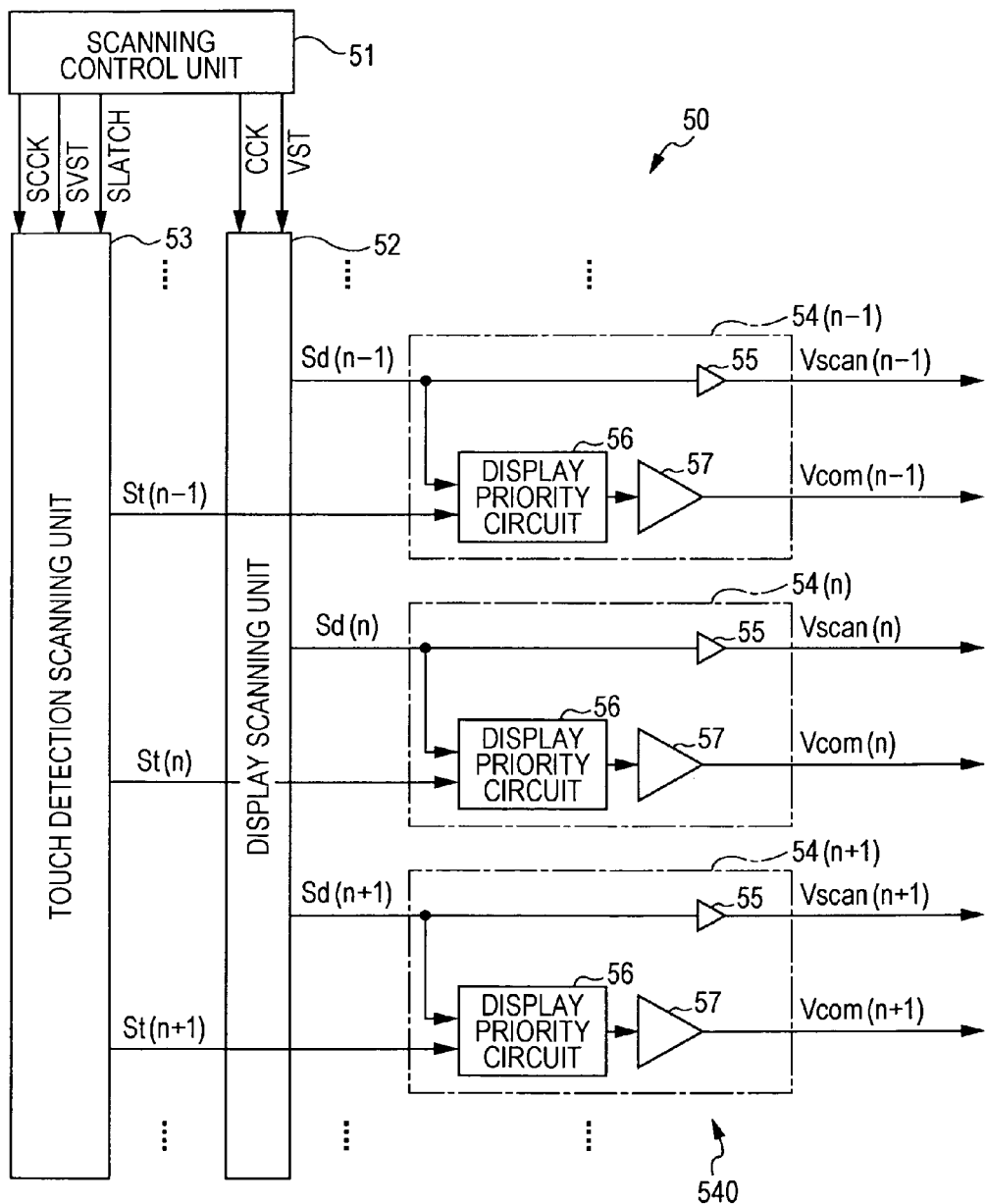
FIG. 8 is a block diagram illustrating a configuration example of a scanning driving unit according to the first embodiment.

FIG. 8 shows a configuration example of the scanning driving unit 50. The scanning driving unit 50 includes a scanning control unit 51, a display scanning unit 52, a touch detection scanning unit 53, and a driving unit 540. A part of the display scanning unit 52, the scanning control unit 51, and the driving unit 540 form the gate driver 12. In addition, a part of the touch detection scanning unit 53, the scanning control unit 51, and the driving unit 540 form the driving electrode driver 14. The driving unit 540 is constituted by N driving units 54(1) to 54(N). Hereinafter, one arbitrary driving unit of the N driving units 54(1) to 54(N) is indicated simply by a driving unit 54.

The scanning control unit 51 respectively supplies control signals to the display scanning unit 52 and the touch detection scanning unit 53 based on the control signals (not shown) supplied from the controller 11. Specifically, the scanning control unit 51 supplies a clock signal CCK and a control signal VST to the display scanning unit 52, and supplies a clock signal SCCK and control signals SVST and SLATCH to the touch detection scanning unit 53.

The display scanning unit 52 includes a shift register and generates signals Sd for selecting the scanning signal lines GCL which sequentially apply the scanning signal Vscan. The signals Sd are used to select the driving electrodes COML which sequentially apply the display driving signal Vcomd. Specifically, the display scanning unit 52, as described later, generates a plurality of signals Sd corresponding to the respective scanning signal lines GCL based on the clock signal CCK and the control signal VST supplied from the scanning control unit 51. In addition, when the display scanning unit 52 applies a signal with a high level as the n-th signal Sd(n) to the n-th driving unit 54(n), the driving unit 54(n) applies the scanning signal Vscan(n) to the scanning signal line GCL in the n-th row and also applies the display driving signal Vcomd to the driving electrode COML (n) in the n-th row. In other words, the display scanning unit 52 outputs the signals Sd with the high level so as to instruct the driving unit 540 to perform the display driving.

The touch detection scanning unit 53 includes a shift register and generates signals St for selecting the driving electrodes COML which sequentially apply the touch detection driving signal Vcomt. Specifically, the touch detection scanning unit 53, as described later, generates a plurality of signals St corresponding to the respective driving electrodes COML based on the clock signal SCCK and the control signals SVST and SLATCH supplied from the scanning control unit 51. When the touch detection scanning unit 53 supplies a signal with the high level as the n-th signal St(n) to the driving unit 54(n), the driving unit 54(n) applies the touch detection driving signal Vcomt to the driving electrode COML(n) in the n-th row. In other words, the touch detection scanning unit 53 outputs the signals St with the high level so as to instruct the driving unit 540 to perform the touch detecting driving.

Figure 9:
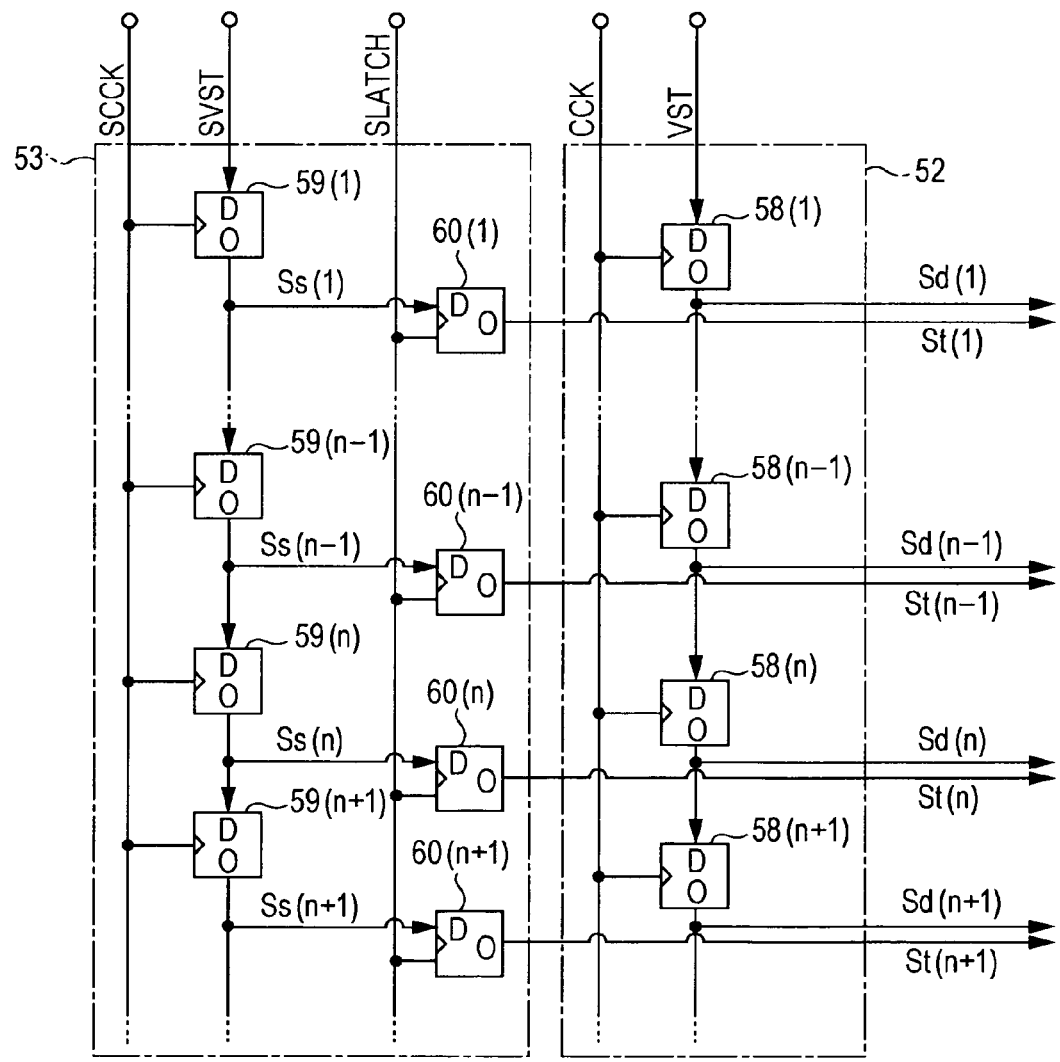
FIG. 9 is a circuit diagram illustrating a configuration example of a display scanning unit and a touch detection scanning unit according to the first embodiment.

FIG. 9 shows a configuration example of the display scanning unit 52 and the touch detection scanning unit 53.

The display scanning unit 52 includes a plurality of flip-flops 58. The flip-flops 58 are connected in series and form a shift register. Clock terminals of the flip-flops 58 are supplied with the clock signal CCK supplied from the scanning control unit 51, and an input terminal D of the first stage flip-flop 58(1) of the shift register is supplied with the control signal VST supplied from the scanning control unit 51. Each of the flip-flops 58 supplies a signal output from the output terminal O thereof to the input terminal D of the next stage flip-flop 58 and also supplies the output signal to the driving unit 540 as the signal Sd.

The flip-flop 58 is a circuit which samples a data signal input to the input terminal D so as to be output from the output terminal O at both the rising and falling timings of the clock signal CCK.

The touch detection scanning unit 53 includes a plurality of flip-flops 59 and a plurality of latches 60. The flip-flops 59 are connected in series and form a shift register. Clock terminals of the flip-flops 59 are supplied with the clock signal SCCK supplied from the scanning control unit 51, and an input terminal D of the first stage flip-flop 59(1) of the shift register is supplied with the control signal SVST supplied from the scanning control unit 51. Each of the flip-flops 59 supplies a signal output from the output terminal O thereof to the input terminal D of the next stage flip-flop 59. Input terminals D of the plurality of latches 60 are connected to the output terminals O of the respective flip-flops 59. The control signal SLATCH supplied from the scanning control unit 51 is input to the clock terminals of the latches 60. Each of the latches 60 supplies a signal output from the output terminal O thereof to the driving unit 540 as the signal St.

In the same manner as the flip-flop 58, the flip-flop 59 is a circuit which samples a data signal input to the input terminal D so as to be output from the output terminal O at both the rising and falling timings of the clock signal SCCK. The latch 60 outputs a data signal input to the input terminal D from the output terminal O when the voltage level of the control signal SLATCH is the high level, and holds the data signal when the voltage level of the control signal SLATCH is the low level.

By this configuration, as described later, the display scanning unit 52 sequentially transmits the control signal VST in the shift register based on the clock signal CCK, thereby generating the signals Sd. In addition, as described later, the touch detection scanning unit 53 sequentially transmits the control signal SVST in the shift register based on the clock signal SCCK, and samples an output from each stage of the shift register based on the control signal SLATCH, thereby generating the signals St.

The driving unit 540 applies the scanning signal Vscan to the scanning signal lines GCL and also applies the driving signal Vcom to the driving electrodes COML based on the signals Sd supplied from the display scanning unit 52 and the signals St supplied from the touch detection scanning unit 53. The driving unit 54 is provided singly so as to correspond to a set of output signals from the display scanning unit 52 and the touch detection scanning unit 53, applies the scanning signal Vscan to the corresponding scanning signal line GCL, and applies the driving signal Vcom to the corresponding driving electrodes COML. The driving unit 54 includes a gate buffer 55, a display priority circuit 56, and a driving signal buffer 57.

The gate buffer 55 is a circuit which applies the scanning signal Vscan to the scanning signal line GCL based on the signal Sd supplied from the display scanning unit 52. Specifically, the gate buffer 55 amplifies the signal Sd to have an amplitude level capable of turning on and off the TFT element Tr of the liquid crystal display device 20.

The display priority circuit 56 controls the driving signal Vcom to be applied to the driving electrode COML based on the signal Sd supplied from the display scanning unit 52 and the signal St supplied from the touch detection scanning unit 53.

The driving signal buffer 57 is a circuit which applies the driving signal Vcom to the driving electrode COML based on a signal supplied from the display priority circuit 56. Specifically, the driving signal buffer 57 applies one of the display driving signal Vcomd, the touch detection driving signal Vcomt, and the DC driving signal Vcomdc to the driving electrode COML based on a signal supplied from the display priority circuit 56.

As waveform examples, FIG. 10A shows the display driving signal Vcomd, FIG. 10B shows the touch detection driving signal Vcomt, and FIG. 10C shows the DC driving signal Vcomdc. The display driving signal Vcomd is a rectangular wave signal having the amplitude Vd as shown in FIG. 10A. The touch detection driving signal Vcomt is a rectangular wave signal equal to the display driving signal Vcomd in the example shown in FIG. 10B, and the amplitude Vt is larger than that of the display driving signal Vcomd. The DC driving signal Vcomdc is a DC signal of 0 V in the example shown in FIG. 10C.

By this configuration, in the driving unit 54(n), when the signal Sd(n) supplied from the display scanning unit 52 is in the high level, the display priority circuit 56 analyzes it as an instruction for the display driving, and the driving signal buffer 57 applies the display driving signal Vcomd to the driving electrode COML(n). In addition, when the signal St(m) supplied from the touch detection scanning unit 53 is in the high level, the display priority circuit 56 analyzes it as an instruction for the touch detection driving, and the driving signal buffer 57 applies the touch detection driving signal Vcomt to the driving electrode COML(n). Further, when the signal Sd(n) supplied from the display scanning unit 52 is in the high level and the signal St(m) supplied from the touch detection scanning unit 53 is in the high level, the driving signal buffer 57 applies the display driving signal Vcomd to the driving electrode COML(n). In other words, when the instructions for both the display driving and the touch detection driving are received, the display priority circuit 56 prioritizes the instruction for the display driving. When the signal Sd(n) supplied from the display scanning unit 52 is in the low level and the signal St(m) supplied from the touch detection scanning unit 53 is in the low level, the display priority circuit 56 analyzes it as neither an instruction for the display driving nor an instruction for the touch detection driving, and the driving signal buffer 57 applies the DC driving signal Vcomdc to the driving electrode COML(n).

FIGS. 11A to 11C show an operation example of the scanning driving unit 50. The scanning driving unit 50 sequentially applies the display driving signal Vcomd and the touch detection driving signal Vcomt to the driving electrodes COML. At this time, when the driving electrodes COML to which the display driving signal Vcomd is applied and the driving electrodes COML to which the touch detection driving signal Vcomt is applied overlap with each other (FIG. 11B), the above-described display driving is prioritized, and thus the display driving signal Vcomd is applied to the overlapping driving electrodes COML.

Here, the driving electrodes COML correspond to a detailed example of "common driving electrodes" according to an embodiment of the present disclosure. The liquid crystal element LC corresponds to a detailed example of a "display element" according to an embodiment of the present disclosure. The touch detection scanning unit 53 corresponds to a detailed example of a "shift register" according to an embodiment of the present disclosure. The control signal SVST corresponds to a detailed example of a "control signal" according to an embodiment of the present disclosure. The clock signal SCCK corresponds to a detailed example of a "clock signal" according to an embodiment of the present disclosure. The latch 60 corresponds to a detailed example of a "timing adjustment unit" according to an embodiment of the present disclosure.

Operation and Function

Next, an operation and a function of the touch detecting function display apparatus 1 according to this embodiment will be described.

Outline of Overall Operation

First, an outline of the overall operation of the touch detecting function display apparatus 1 will be described with reference to FIG. 4. The controller 11 supplies control signals to the gate driver 12, the source driver 13, the driving signal generation unit 15, the driving electrode driver 14, and the touch detection unit 40, based on a video signal Vdisp supplied from an external device, so as to control them to be operated in synchronization with each other. The gate driver 12 supplies the scanning signal Vscan to the liquid crystal display device 20 and sequentially selects one horizontal line which is a target of the display driving. The source driver 13 supplies the pixel signal Vpix to each of the pixels Pix forming the one horizontal line selected by the gate driver 12. The driving signal generation unit 15 generates the display driving signal Vcomd for the display operation and the touch detection driving signal Vcomt for the touch detection operation. The driving electrode driver 14, during the display operation, sequentially applies the display driving signal Vcomd to the driving electrodes COML related to the one horizontal line which is a target of the display driving, and, during the touch detection operation, sequentially applies the touch detection driving signal Vcomt to the driving electrodes COML related to the touch detection operation. The touch detecting function display device 10 performs the display operation based on the signals supplied from the gate driver 12, the source driver 13, and the driving electrode driver 14, and outputs the touch detection signal Vdet from the touch detection electrodes TDL by performing the touch detection operation based on the touch detection driving signal Vcomt supplied from the driving electrode driver 14. The analog LPF unit 42 removes the high frequency component from the touch detection signal Vdet so that it is output. The A/D converter 43 converts an analog signal output from the analog LPF unit 42 into a digital signal. The signal processing unit 44 detects whether or not the touch detecting function display device 10 is touched based on the output signal from the A/D converter 43. The coordinate detection unit 45 obtains coordinates for a touched panel when a touch is detected by the signal processing unit 44. The detection timing control unit 46 controls the analog LPF unit 42, the A/D converter 43, the signal processing unit 44, and the coordinate detection unit 45 to be operated in synchronization with each other.

Hereinafter, a detailed operation of the touch detecting function display apparatus 1 will be described.

Display Operation and Touch Detection Operation

FIGS. 12A to 12F show an example of the display operation and the touch detection operation of the touch detecting function display apparatus 1, wherein FIG. 12A shows a waveform of the display driving signal Vcomd; FIG. 12B shows a waveform of the touch detection driving signal Vcomt; FIG. 12C shows waveforms of the driving signal Vcom; FIG. 12D shows waveforms of the scanning signal Vscan; FIG. 12E shows a waveform of the pixel signal Vpix; and FIG. 12F shows a waveform of the touch detection signal Vdet. As shown in FIG. 12C, this example indicates a case where the driving electrodes COML(n−2) to COML(n+2) in the (n−2)-th row to the (n+2)-th row are sequentially selected as targets of the display driving, and the driving electrodes COML(k−4) to COML(k+5) in the (k−4)-th row to the (k+5)-th row are sequentially selected as targets of the touch detection driving.

In the touch detecting function display apparatus 1, during the display operation, the gate driver 12 applies the scanning signal Vscan to the scanning signal lines GCL (FIG. 12D), and the driving electrode driver 14 sequentially applies the display driving signal Vcomd to the driving electrodes COML corresponding to the scanning signal lines GCL, thereby performing the display scanning (the driving signals Vcom(n−2) to Vcom(n+2) in FIG. 12C). In addition, during one horizontal period (1H), the source driver 13 supplies the pixel signal Vpix to the one horizontal line to which the scanning signal Vscan and the display driving signal Vcomd are applied, thereby performing a display of the one horizontal line. During the touch detection operation, the driving electrode driver 14 applies the touch detection driving signal Vcomt having larger amplitude than the display driving signal Vcomd to six driving electrodes COML in this example (the driving signals Vcom(k−4) to Vcom(k+5) in FIG. 12C), and the driving electrodes COML applied with the touch detection driving signal Vcomt are shifted by two for each horizontal period in this example, thereby performing the touch detection scanning. In other words, the touch detection scanning is performed twice the speed of the display scanning. During each horizontal period (1H), the touch detection unit 40 detects a touch based on the touch detection signal Vdet. Hereinafter, details thereof will be described.

First, the driving electrode driver 14 applies the driving signal Vcom to the driving electrode COML at the timing t1. Specifically, the driving electrode driver 14 applies the display driving signal Vcomd (the driving signal Vcom(n−1)) to the driving electrode COML(n−1) in the (n−1)-th row (FIG. 12C). At the same time, the driving electrode driver 14 applies the touch detection driving signal Vcomt (the driving signals Vcom(k−4) to Vcom(k+1)) to the six driving electrodes COML(k−4) to COML(k+1) in the (k−4)-th row to the (k+1)-th row (FIG. 12C). Thereby, one horizontal period (1H) starts. At this time, the display driving signal Vcomd and the touch detection driving signal Vcomt are sent to the touch detection electrodes TDL via the capacitors, and the touch detection signal Vdet varies (FIG. 12F).

Next, the gate driver 12 applies the scanning signal Vscan to the scanning signal lines GCL(n−1) in the (n−1)-th row at the timing t2, and the scanning signal Vscan(n−1) is changed from the low level to the high level (FIG. 12D).

Thereafter, the source driver 13 applies the pixel signal Vpix to the pixel signal line SGL at the timing t3 (FIG. 12E), and performs display of one horizontal line. After the source driver 13 finishes the supply of the pixel signal Vpix, the gate driver 12 changes the scanning signal Vscan(n−1) for the scanning signal line GCL(n−1) in the (n−1)-th row from the high level to the low level (FIG. 12D).

Next, the A/D converter 43 A/D converts an output signal from the analog LPF unit 42 to which the touch detection signal Vdet is input, at the sampling timing ts1 (FIG. 12F).

Thereafter, the driving electrode driver 14 applies the driving signal Vcom to the driving electrode COML at the timing t11. Specifically, the driving signal generation unit 15 reverses the display driving signal Vcomd (FIG. 12A), and the driving electrode driver 14 applies the display driving signal Vcomd (the driving signal Vcom(n)) to the driving electrode COML(n) in the n-th row (FIG. 12C). At the same time, the driving signal generation unit 15 reverses the touch detection driving signal Vcomt (FIG. 12B), and the driving electrode driver 14 applies the touch detection driving signal Vcomt (the driving signals Vcom(k−2) to Vcom(k+3)) to the six driving electrodes COML(k−2) to COML(k+3) in the (k−2)-th row to the (k+3)-th row (FIG. 12C). Thereby, the next one horizontal period (1H) starts. At this time, the display driving signal Vcomd and the touch detection driving signal Vcomt are sent to the touch detection electrodes TDL via the capacitors, and the touch detection signal Vdet varies (FIG. 12F).

Next, the A/D converter 43 A/D converts an output signal from the analog LPF unit 42 to which the touch detection signal Vdet is input, at the sampling timing ts2 (FIG. 12F). The signal processing unit 44 of the touch detection unit 40 performs the touch detections based on a difference between the A/D conversion result at the sampling timing ts1 and the A/D conversion result at the sampling timing ts2.

Next, after the gate driver 12 applies the scanning signal Vscan to the scanning signal line GCL(n) in the n-th row at the timing t12, and the scanning signal Vscan(n) is changed from the low level to the high level (FIG. 12D), the source driver 13 applies the pixel signal Vpix to the pixel signal line SGL at the timing t13 (FIG. 12E). In addition, in this example, the touch detecting function display apparatus 1 performs inversion driving, and thus the pixel signal Vpix applied by the source driver 13 reverses the polarity as compared with that in previous one horizontal period. After the source driver 13 finishes the supply of the pixel signal Vpix, the gate driver 12 changes the scanning signal Vscan(n) for the scanning signal line GCL(n) in the n-th row from the high level to the low level (FIG. 12D).

Thereafter, through the repetition of the above-described operations, the touch detecting function display apparatus 1 performs the display operation for the entire surface by sequentially scanning the entire surface of the liquid crystal display device 20, and also performs the touch detection operation for the entire surface by sequentially scanning the entire surface of the touch detection device 30.

As above, in the touch detecting function display apparatus 1, since the amplitude Vt of the touch detection driving signal Vcomt is larger than the amplitude Vd of the display driving signal Vcomd, an amount of a voltage to be varied in the touch detection signal Vdet can be made to be larger than in the case where the display driving signal Vcomd is commonly used as the touch detection driving signal, thereby increasing the touch detection sensitivity.

Next, an operation of the scanning driving unit 50 of when the above-described display operation and touch detection operation are performed will be described in detail. Hereinafter, the display scanning unit 52, the touch detection scanning unit 53, and the driving unit 54 which are the constituent elements of the scanning driving unit 50 will be first described, and then the description of the scanning driving unit 50 will be made.

Detailed Operation of Display Scanning Unit 52

FIGS. 13A to 13C show an operation example of the display scanning unit 52, wherein FIG. 13A shows a waveform of the control signal VST; FIG. 12B shows a waveform of the clock signal CCK; and FIG. 13C shows waveforms of the signals Sd.

The scanning control unit 51 generates the control signal VST having the pulse width corresponding to the half cycle of the clock signal CCK, so as to be supplied to the display scanning unit 52 (FIG. 13A). The shift register including the flip-flops 58 performs serial parallel conversion for the control signal VST based on the clock signal CCK (FIG. 13B) supplied from the same scanning control unit 51. Specifically, the first stage flip-flop 58(1) of the shift register samples the control signal VST at both the rising and falling timings of the clock signal CCK and outputs the signal Sd(1) from the output signal O (FIG. 13C). The next stage flip-flop 58(2) connected to the flip-flop 58(1) samples the output signal Sd(1) from the flip-flop 58(1) at both the rising and falling timings of the clock signal CCK and outputs the signal Sd(2) from the output terminal O (FIG. 13C). Thereby, the signal Sd(2) is delayed by the half cycle of the clock signal CCK with respect to the output signal Sd(1) from the previous stage flip-flop 58(1).

As such, all the flip-flops 58 in the shift register are operated in the same manner, and thus the pulse of the control signal VST sequentially appears in the signals Sd by being transmitted in the shift register every half cycle of the clock signal CCK. Based on the signals Sd, the driving unit 54 applies the scanning signal Vscan to the scanning signal lines GCL and applies the display driving signal Vcomd to the driving electrodes COML, thereby performing the display scanning shown in FIGS. 12C and 12D. In other words, the scanning driving unit 50 sequentially applies the scanning signal Vscan (FIG. 12D) to the scanning signal lines GCL and also sequentially applies the driving signals Vcom(n−2) to Vcom(n+2) of the display driving signal Vcomd (FIG. 12C) to the driving electrodes COML, thereby performing the display scanning.

Detailed Operation of Touch Detection Scanning Unit 53

Next, operation examples of the touch detection scanning unit 53 will be described using several examples.

FIGS. 14A to 14F show an operation example of the touch detection scanning unit 53, wherein FIG. 14A shows a waveform of the control signal SVST; FIG. 14B shows a waveform of the clock signal CCK; FIG. 14C shows a waveform of the clock signal SCCK; FIG. 14D shows a waveform of the control signal SLATCH; FIG. 14E shows waveforms of the output signals Ss from the flip-flops 59; and FIG. 14F shows waveforms of the signals St.

The scanning control unit 51 supplies the control signal SLATCH having pulses at both the rising and falling timings of the clock signal CCK (FIG. 14B) which is supplied to the display scanning unit 52, to the touch detection scanning unit 53 (FIG. 14D). In addition, the scanning control unit 51 generates the control signal SVST which has the pulse width corresponding to three cycles of the control signal SLATCH, and the clock signal SOCK which has one rise and one fall for one cycle of the control signal SLATCH, so as to be supplied to the touch detection scanning unit 53 (FIGS. 14A and 14C). The shift register including the flip-flops 59 performs serial parallel conversion for the control signal SVST based on the clock signal SOCK (FIG. 14E). In addition, the latches 60 output the output signals from the shift register as the signals St at the rising timings of the control signal SLATCH, that is, at the rising and falling timings of the clock signal CCK (FIG. 14F).

Specifically, the first stage flip-flop 59(1) of the shift register samples the control signal SVST at both the rising and falling timings of the clock signal SOCK and outputs the sampling result as the signal Ss(1), and the next stage flip-flop 59(2) connected to the flip-flop 59(1) samples the output signal Ss(1) from the flip-flop 59(1) at both the rising and falling timings of the clock signal SOCK and outputs the sampling result as the signal Ss(2) (FIG. 14E). In addition, when the control signal SLATCH is in the high level, the latch 60(1) samples the output signal Ss(1) from the flip-flop 59(1) and outputs the sampling result as the signal St(1), and the latch 60(2) samples the output signal Ss(2) from the flip-flop 59(2) and outputs the sampling result as the signal St(2) (FIG. 14F). Thereby, the signals St(1) and St(2) have the same waveform. Thereafter, the next stage flip-flop 59(3) connected to the flip-flop 59(2) samples the output signal Ss(2)

output from the flip-flop 59(2) at both the rising and falling timings of the clock signal SCCK and outputs the sampling result as the signal Ss(3) (FIG. 14E). The next stage flip-flop 59(4) connected to the flip-flop 59(3) samples the output signal Ss(3) from the flip-flop 59(3) at both the rising and falling timings of the clock signal SCCK and outputs the sampling result as the signal Ss(4) (FIG. 14E). When the control signal SLATCH is in the high level, the latch 60(3) samples the output signal Ss(3) from the flip-flop 59(3) and outputs the sampling result as the signal St(3), and the latch 60(4) samples the output signal Ss(4) from the flip-flop 59(4) and outputs the sampling result as the signal St(4) (FIG. 14F). Thereby, the signals St(3) and St(4) have the same waveform, and are delayed by one cycle of the control signal SLATCH with respect to the signals St(1) and St(2).

As such, all the flip-flops 59 in the shift register are operated in the same manner, and thus the pulse of the control signal SVST sequentially appears in the signals St at timings corresponding to the control signal SLATCH by being transmitted in the shift register. In this example, the control signal SVST has the pulse width corresponding to the three cycles of the control signal SLATCH, and thus the pulse having the pulse width appears in each signal St. The clock signal SCCK has one rise and one fall (has two transitions) for one cycle of the control signal SLATCH, and thus two signals St (for example, the signal St(1) and the signal St(2)) are output at the same timing. In other words, the touch detection scanning unit 53 is operated such that six (=3×2) signals St have the high level at the same time (the waveforms A1), and the signals St having the high level are shifted by two every cycle of the control signal SLATCH.

The driving unit 54 applies the touch detection driving signal Vcomt to the driving electrodes COML based on the signals St, thereby performing the touch detection scanning shown in FIG. 12C. In other words, the scanning driving unit 50 applies the touch detection driving signal Vcomt (the driving signals Vcom(k−4) to Vcom(k+5) in FIG. 12C) to six driving electrodes COML, and shifts the driving electrodes COML which apply the touch detection driving signal Vcomt by two for each horizontal period, thereby performing the touch detection scanning.

FIGS. 15A to 15F show another operation example of the touch detection scanning unit 53, wherein FIG. 15A shows a waveform of the control signal SVST; FIG. 15B shows a waveform of the clock signal CCK; FIG. 15C shows a waveform of the clock signal SCCK; FIG. 15D shows a waveform of the control signal SLATCH; FIG. 15E shows waveforms of the output signals Ss from the flip-flops 59; and FIG. 15F shows waveforms of the signals St. In the example shown in FIGS. 14A to 14F, the control signal SVST has the pulse width corresponding to three cycles of the control signal SLATCH, however, in the example shown in FIGS. 15A to 15F, the control signal SVST has the pulse width corresponding to four cycles of the control signal SLATCH.

In this example, the control signal SVST has the pulse width corresponding to the four cycles of the control signal SLATCH, and thus the pulse having the pulse width appears in each signal St (FIG. 15F). The clock signal SCCK has one rise and one fall (has two transitions) for one cycle of the control signal SLATCH, and thus two signals St (for example, the signal St(1) and the signal St(2)) are output at the same timing (FIG. 15F). In other words, the touch detection scanning unit 53 is operated such that eight (=4×2) signals St have the high level at the same time (the waveforms A2), and the signals St having the high level are shifted by two every cycle of the control signal SLATCH.

Thereby, the scanning driving unit 50 applies the touch detection driving signal Vcomt to eight driving electrodes COML, and shifts the driving electrodes COML which apply the touch detection driving signal Vcomt by two for each horizontal period, thereby performing the touch detection scanning.

In the above examples, during the display operation, when applying the display driving signal Vcomd to the driving electrodes COML, the scanning driving unit 50 shifts the driving electrodes COML which are the application targets by one for each horizontal period, thereby performing the sequential scanning, and, during the touch detection operation, when applying the touch detection driving signal Vcomt to the driving electrodes COML, shifts the driving electrodes COML by two for each horizontal period, thereby performing the sequential scanning. In other words, the touch detection scanning is performed at the scanning speed two times higher than that of the display scanning.

Figure 16:
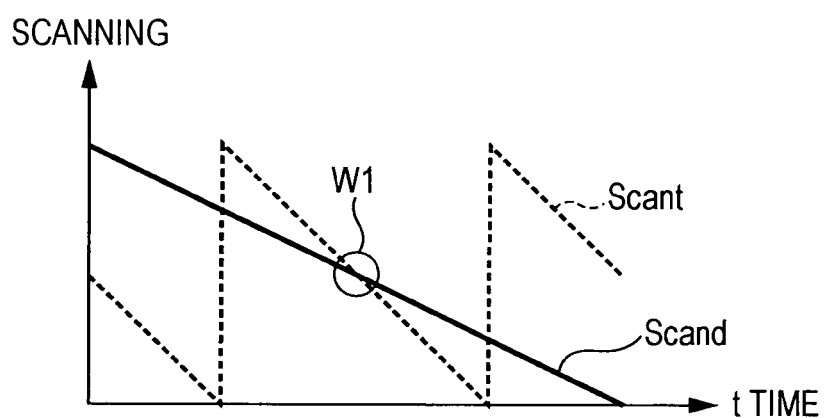
FIG. 16 is a schematic diagram illustrating an operation example of the scanning driving unit according to the first embodiment.

FIG. 16 schematically shows the display scanning and the touch detection scanning, and shows an example of a case where the touch detection scanning is performed at the scanning speed two times higher than that of the display scanning. In the touch detecting function display apparatus 1, the scanning driving unit 50 can perform the display scanning Scand and the touch detection scanning Scant independently, and thus can separately apply the display driving signal Vcomd for the display operation and the touch detection driving signal Vcomt for the touch detection operation to the driving electrodes COML. Thereby, the speed of the touch detection scanning Scant and the display scanning Scand can be set separately from each other. For example, as shown in FIG. 16, if the speed of the touch detection scanning is made to be higher than the speed of the display scanning, a rapid response to the touch by an external approaching object can be made, thereby improving the response characteristic of the touch detection.

Next, an operation example of the touch detection scanning unit 53 which performs the touch detection scanning at a scanning speed different from that in the above example will be described.

Figure 17:
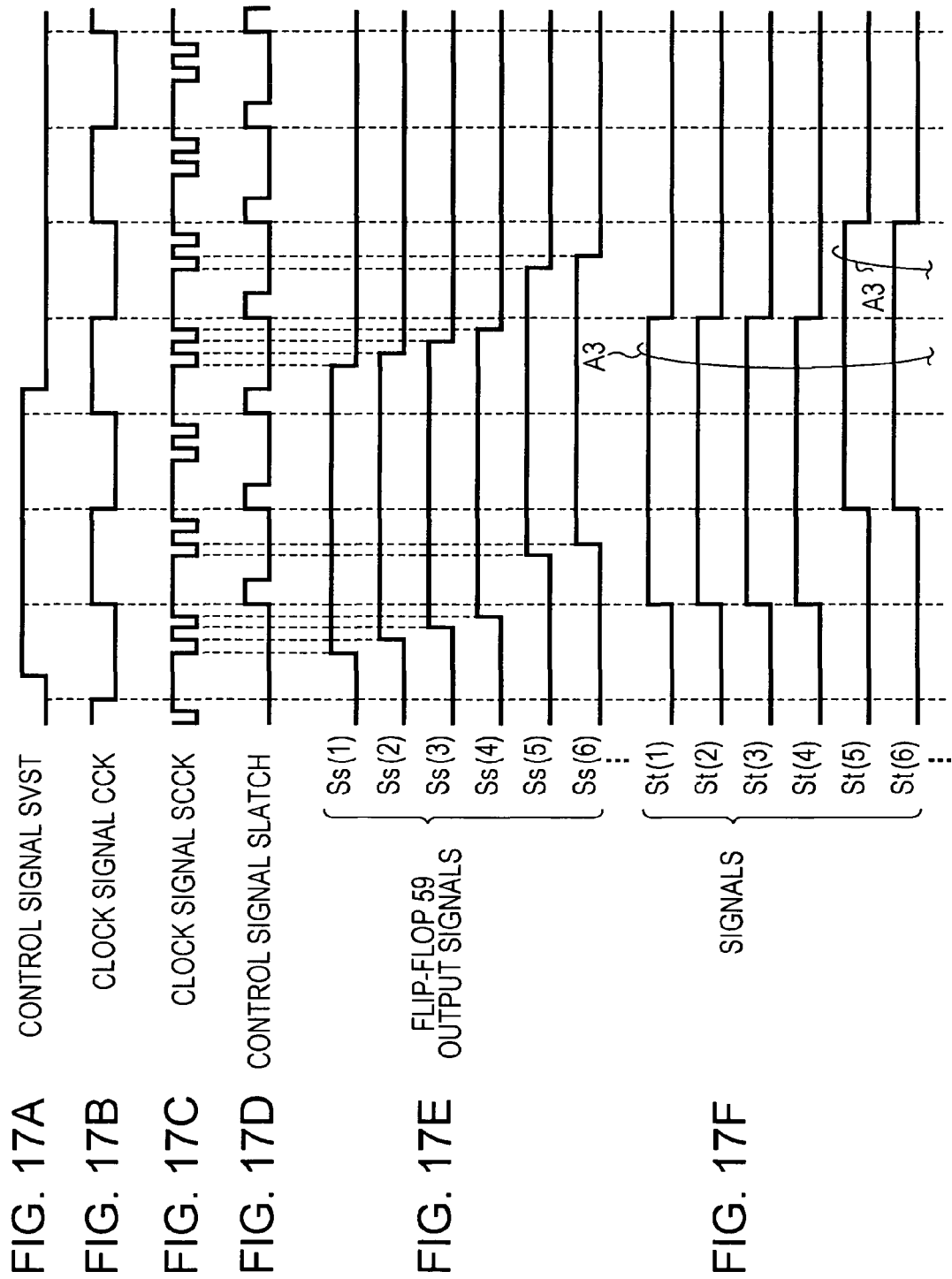
FIGS. 17A to 17F are timing waveform diagrams illustrating another operation example of the touch detection scanning unit according to the first embodiment.

FIGS. 17A to 17F show another operation example of the touch detection scanning unit 53, wherein FIG. 17A shows a waveform of the control signal SVST; FIG. 17B shows a waveform of the clock signal CCK; FIG. 17C shows a waveform of the clock signal SCCK; FIG. 17D shows a waveform of the control signal SLATCH; FIG. 17E shows waveforms of the output signals Ss from the flip-flops 59; and FIG. 17F shows waveforms of the signals St. In the example shown in FIGS. 14A to 14F, the clock signal SCCK is used which has one rise and one fall (has two transitions) for one cycle of the control signal SLATCH, but, in the example shown in FIGS. 17A to 17F, the clock signal SCCK is used which has four transitions.

In this example, the control signal SVST has the pulse width corresponding to three cycles of the control signal SLATCH, and thus the pulse having the pulse width corresponding to the three cycles of the control signal SLATCH appears in each signal St (FIG. 17F). The clock signal SCCK has four transitions for one cycle of the control signal SLATCH, and thus four signals St (for example, the signal St(1) to the signal St(4)) are output at the same timing (FIG. 17F). In other words, the touch detection scanning unit 53 is operated such that twelve (=3×4) signals St have the high level at the same time (the waveforms A3), and the signals St having the high level are shifted by four every cycle of the control signal SLATCH.

Thereby, the scanning driving unit 50 applies the touch detection driving signal Vcomt to twelve driving electrodes COML, and shifts the driving electrodes COML which apply the touch detection driving signal Vcomt by four for each horizontal period, thereby performing the touch detection scanning. In other words, in this example, the touch detection scanning is performed at the scanning speed four times higher than that of the display scanning.

Figure 18:
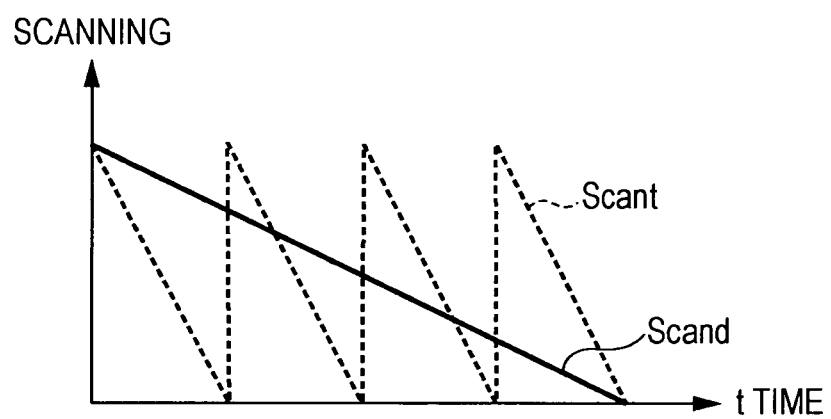
FIG. 18 is a schematic diagram illustrating another operation example of the scanning driving unit according to the first embodiment.

FIG. 18 schematically shows the display scanning and the touch detection scanning, and shows an example of a case where the touch detection scanning is performed at the scanning speed four times higher than that of the display scanning. In this way, the speed of the touch detection scanning is made to be higher, and thus it is possible to further improve the response characteristic of the touch detection.

Detailed Operation of Driving Unit 54

Figure 19:
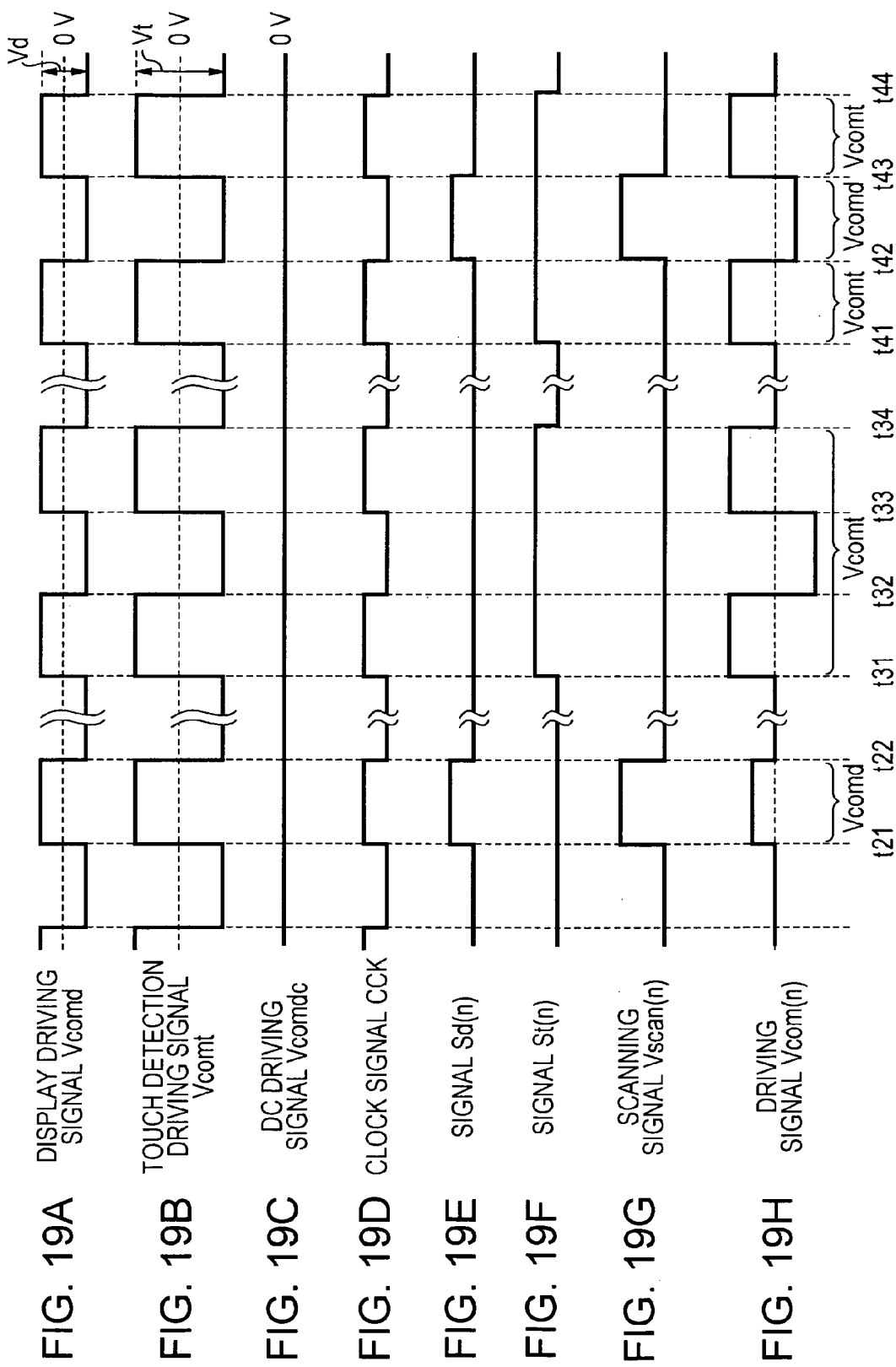
FIGS. 19A to 19H are timing waveform diagrams illustrating an operation example of a driving unit according to the first embodiment.

FIGS. 19A to 19H show an operation example of the driving unit 54(n), wherein FIG. 19A shows a waveform of the display driving signal Vcomd; FIG. 19B shows a waveform of the touch detection driving signal Vcomt; FIG. 19C shows a waveform of the DC driving signal Vcomdc; FIG. 19D shows a waveform of the clock signal CCK; FIG. 19E shows a signal Sd(n); FIG. 19F shows a waveform of the signal St(n); FIG. 19G shows a waveform of the scanning signal Vscan(n); and FIG. 19H shows a waveform of the driving signal Vcom(n).

In the display operation, the driving unit 54 applies the scanning signal Vscan to the scanning signal lines GCL and also applies the display driving signal Vcomd to the driving electrodes COML, based on the signals Sd output from the display scanning unit 52. In the touch detection operation, the driving unit 54 applies the touch detection driving signal Vcomt to the driving electrodes COML based on the signals St output from the touch detection scanning unit 53. When the driving electrodes COML related to targets of the display driving and the driving electrodes COML related to targets of the touch detection driving overlap with each other, the driving unit 54 applies the display driving signal Vcomd to the driving electrodes COML. Hereinafter, details thereof will be described.

When the signal Sd(n) with the high level is supplied from the display scanning unit 52, the driving unit 54(n) makes the scanning signal Vscan(n) have the high level as shown in the timings t21 and t22 (FIG. 19G) and also outputs the display driving signal Vcomd as the driving signal Vcom(n) (FIG. 19H). Specifically, the gate buffer 55 amplifies the supplied signal Sd(n) so as to be output as the scanning signal Vscan(n) (FIG. 19G). In addition, the display priority circuit 56 analyzes the signal Sd(n) with the high level and the signal St(n) with the low level as an instruction for the display driving, and the driving signal buffer 57 outputs the display driving signal Vcomd (FIG. 19A) as the driving signal Vcom(n) (FIG. 19H).

When the signal St(n) with the high level is supplied from the touch detection scanning unit 53, the driving unit 54(n) outputs the touch detection driving signal Vcomt as the driving signal Vcom(n) as shown in the timings t31 to t34 (FIG. 19H). Specifically, the display priority circuit 56 analyzes the signal St(n) with the high level and the signal Sd(n) with the low level as an instruction for the touch detection driving, and the driving signal buffer 57 outputs the touch detection driving signal Vcomt (FIG. 19B) as the driving signal Vcom(n) (FIG. 19H).

When the signal Sd(n) with the high level is supplied from the display scanning unit 52 and the signal St(n) with the high level is supplied from the touch detection scanning unit 53, the driving unit 54(n) makes the scanning signal Vscan(n) have the high level (FIG. 19G) and also outputs the display driving signal Vcomd as the driving signal Vcom(n) (FIG. 19H). Specifically, first, when the signal St(n) has the high level at the timing t41, the display priority circuit 56 analyzes the signal St(n) with the high level and the signal Sd(n) with the low level as an instruction for the touch detection driving, and the driving signal buffer 57 outputs the touch detection driving signal Vcomt (FIG. 19B) as the driving signal Vcom(n) (FIG. 19H). Next, when the signal Sd(n) has the high level at the timing t42, the display priority circuit 56 analyzes the signal St(n) with the high level and the signal Sd(n) with the high level as an instruction for the display driving, and the driving signal buffer 57 outputs the display driving signal Vcomd (FIG. 19A) as the driving signal Vcom(n) (FIG. 19H). In other words, when the instructions for both the display driving and the touch detection driving are received, the display priority circuit 56 prioritizes the instruction for the display driving. When the signal Sd(n) has the low level at the timing t43, the display priority circuit 56 analyzes the St(n) with the high level and the signal Sd(n) with the low level as the instruction for the touch detection driving, and the driving signal buffer 57 outputs the touch detection driving signal Vcomt (FIG. 19B) as the driving signal Vcom(n) (FIG. 19H).

Detailed Operation of Scanning Driving Unit 50

Figure 20:
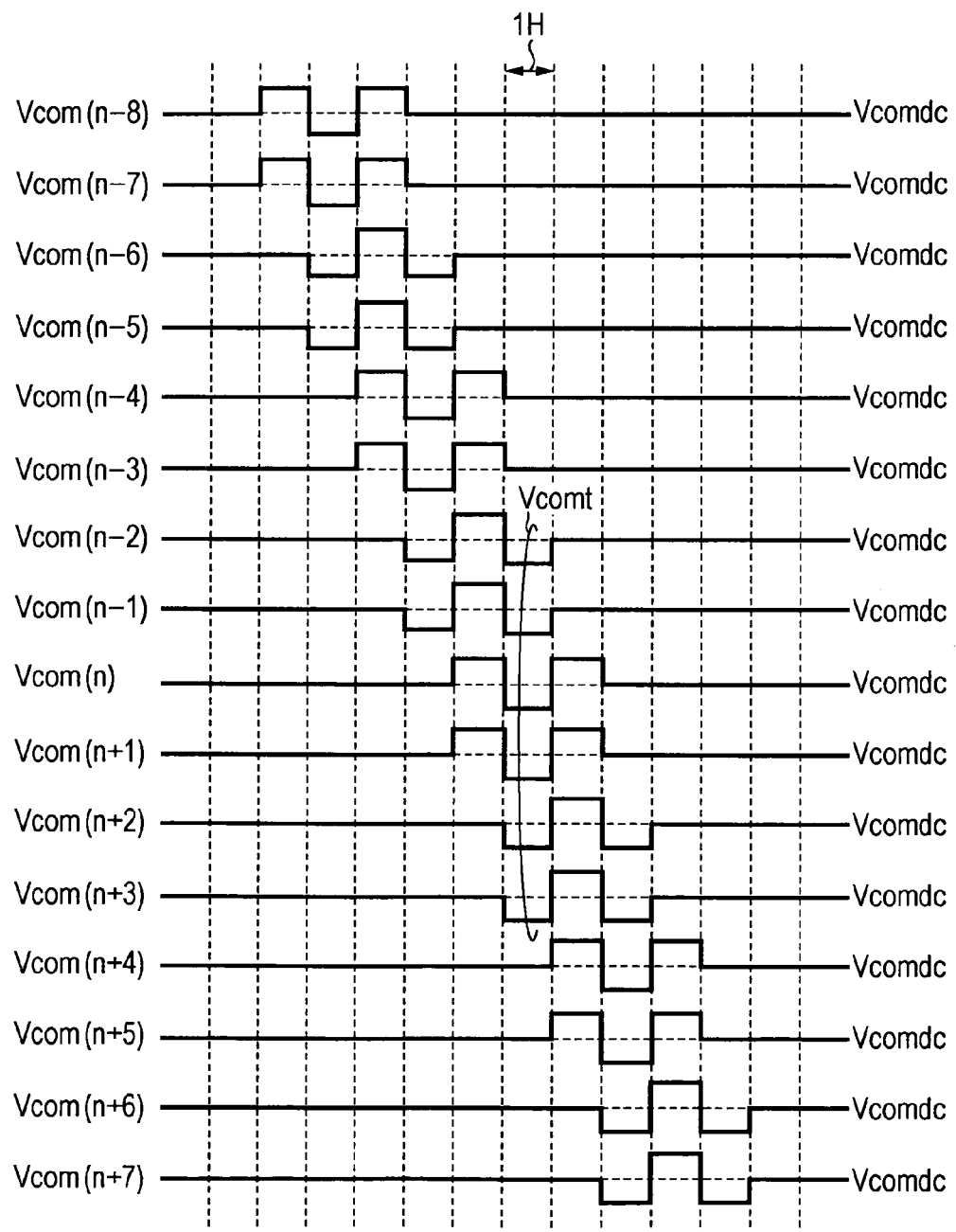
FIG. 20 is a timing waveform diagram illustrating an operation example of the scanning driving unit according to the first embodiment.

FIG. 20 shows an example of the touch detection driving operation of the scanning driving unit 50. As shown in FIG. 20, the scanning driving unit 50 applies, in this example, the touch detection driving signal Vcomt (for example, the driving signals Vcom(n−2) to Vcom(n+3)) to the six neighboring driving electrodes COML (for example, the driving electrodes COML(n−2) to COML(n+3) in the (n−2)-th row to the (n+3)-th row). In addition, the scanning driving unit 50 shifts the driving electrodes COML which apply the touch detection driving signal Vcomt by two for each horizontal period, thereby performing the touch detection scanning.

Figure 21:
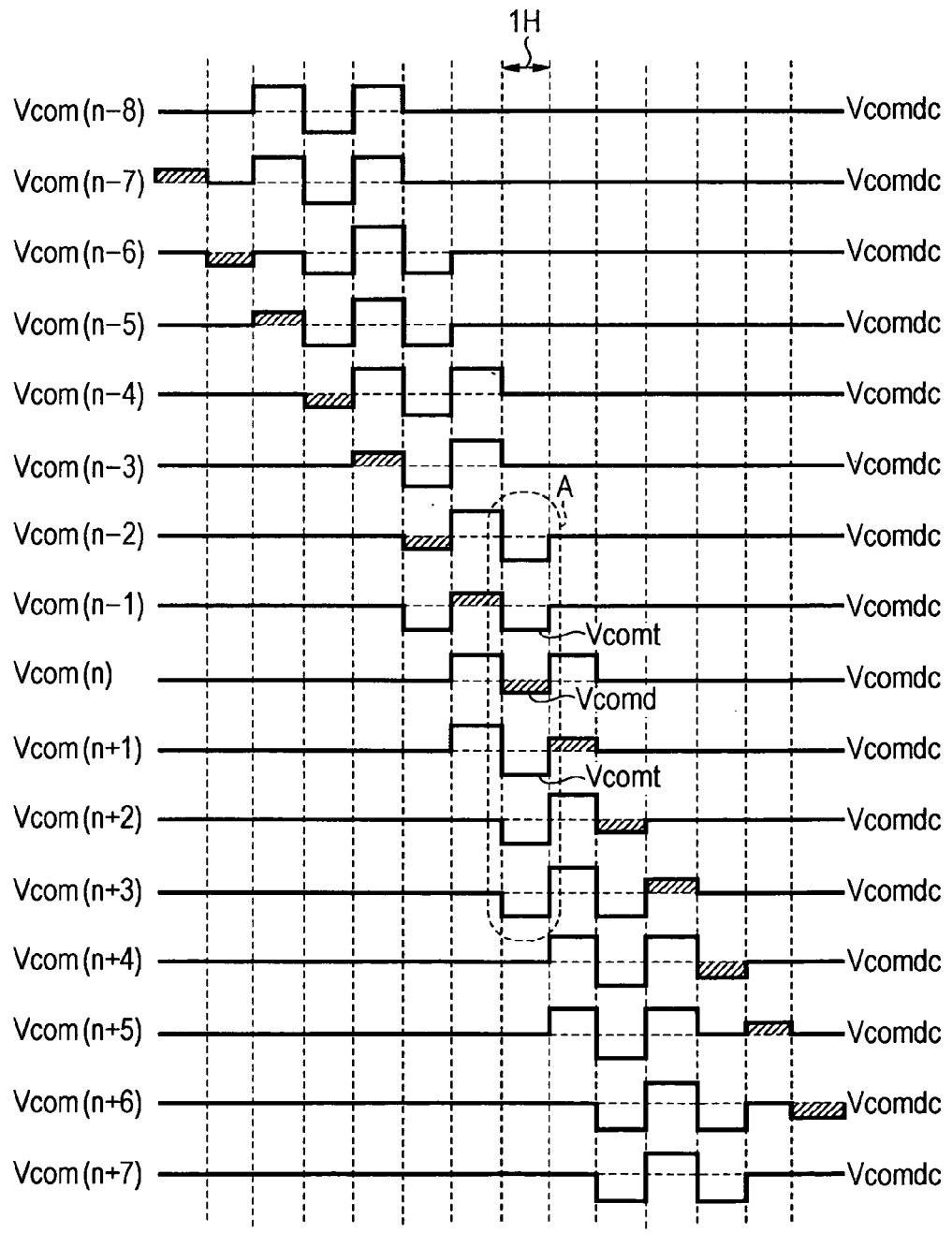
FIG. 21 is a timing waveform diagram illustrating another operation example of the scanning driving unit according to the first embodiment.

FIG. 21 shows an example of the display driving operation and the touch detection driving operation of the scanning driving unit 50, and shows a case where the display scanning is overtaken by the touch detection scanning. In other words, the FIG. 21 shows an operation around the timing W1 in FIG. 16. The scanning driving unit 50 applies the display driving signal Vcomd to the driving electrodes COML related to targets of the display driving and also applies the touch detection driving signal Vcomt to the driving electrodes COML related to targets A of the touch detection driving. In FIG. 21, the diagonal parts indicate the display driving signal Vcomd which is applied to the driving electrodes COML related to the targets of the display driving, and, during that period, the source driver 13 supplies the pixel signal Vpix to one horizontal line corresponding to the driving electrodes COML. When the display scanning is overtaken by the touch detection scanning, the driving electrodes COML related to the targets of the display driving overlap with the driving electrodes COML related to the targets A of the touch detection driving. At this time, the scanning driving unit 50 is operated so as to prioritize the display driving, and applies the display driving signal Vcomd to the driving electrodes COML as shown in FIG. 21.

As above, in the touch detecting function display apparatus 1, the display driving signal Vcomd is applied to the driving electrodes COML related to the horizontal line to which the pixel signal Vpix is applied by the source driver 13, regardless of the overtaken state. In other words, the touch detecting function display apparatus 1, since the scanning driving unit 50 is operated so as to prioritize the display driving, there is no case where the touch detection driving signal Vcomt is applied to the driving electrodes COML related to the horizontal line to which the pixel signal Vpix is applied in the overtaken state. Thereby, it is possible to suppress a disordered display caused by the overtaking to the minimum.

Effects

As described above, in this embodiment, since the display scanning and the touch detection scanning can be performed independently, the speed of the touch detection scanning can be made to be higher than the speed of the display scanning, thereby improving the response performance of the touch detection.

In this embodiment, since the speed of the touch detection scanning can be changed by the number of the transitions of the clock signal SCCK supplied to the touch detection scanning unit, the touch detection characteristic can be adjusted even after the touch detecting function display apparatus is manufactured. For example, if the number of the transitions of the clock signal SCCK is made to increase, an amount of the driving electrodes, which are targets of the touch detection driving, to be shifted for each horizontal period increases, and the speed of the touch detection scanning can be heightened, thereby improving the response characteristic of the touch detection.

In addition, in this embodiment, since the number of the driving electrodes COML which are targets of the touch detection driving can be changed by the pulse width of the control signal SVST supplied to the touch detection scanning unit, the touch detection characteristic can be adjusted even after the touch detecting function display apparatus is manufactured. For example, if the pulse width of the control signal SVST is made to be large, the number of the driving electrodes COML which simultaneously apply the touch detection driving signal also becomes large, and variations in the capacitance due to an external approaching object can increase, thereby improving the touch detection sensitivity.

Further, in this embodiment, since the display driving signal and the touch detection driving signal are separately applied to the driving electrodes, the amplitude of the touch detection driving signal can be greater than the amplitude of the display driving signal, thereby improving the detection sensitivity of the touch detection.

In this embodiment, when the driving electrodes which are targets of the display driving overlap with the driving electrodes which are targets of the touch detection driving, the display driving signal Vcomd is applied to the overlapping driving electrodes, and thereby it is possible to suppress to the minimum disordered display caused by the overtaking scanning.

3. Second Embodiment

Next, a touch detecting function display apparatus 7 according to a second embodiment of the present disclosure will be described. The touch detecting function display apparatus 7 is configured using a scanning driving unit 70 having a simple touch detection scanning unit. The remaining configurations are the same as those in the first embodiment (FIGS. 1A and 1B, and the like). In addition, the constituent elements which are substantially the same as in the touch detecting function display apparatus 1 according to the first embodiment are given the same reference numerals, and the description thereof will be appropriately omitted.

Figure 22:
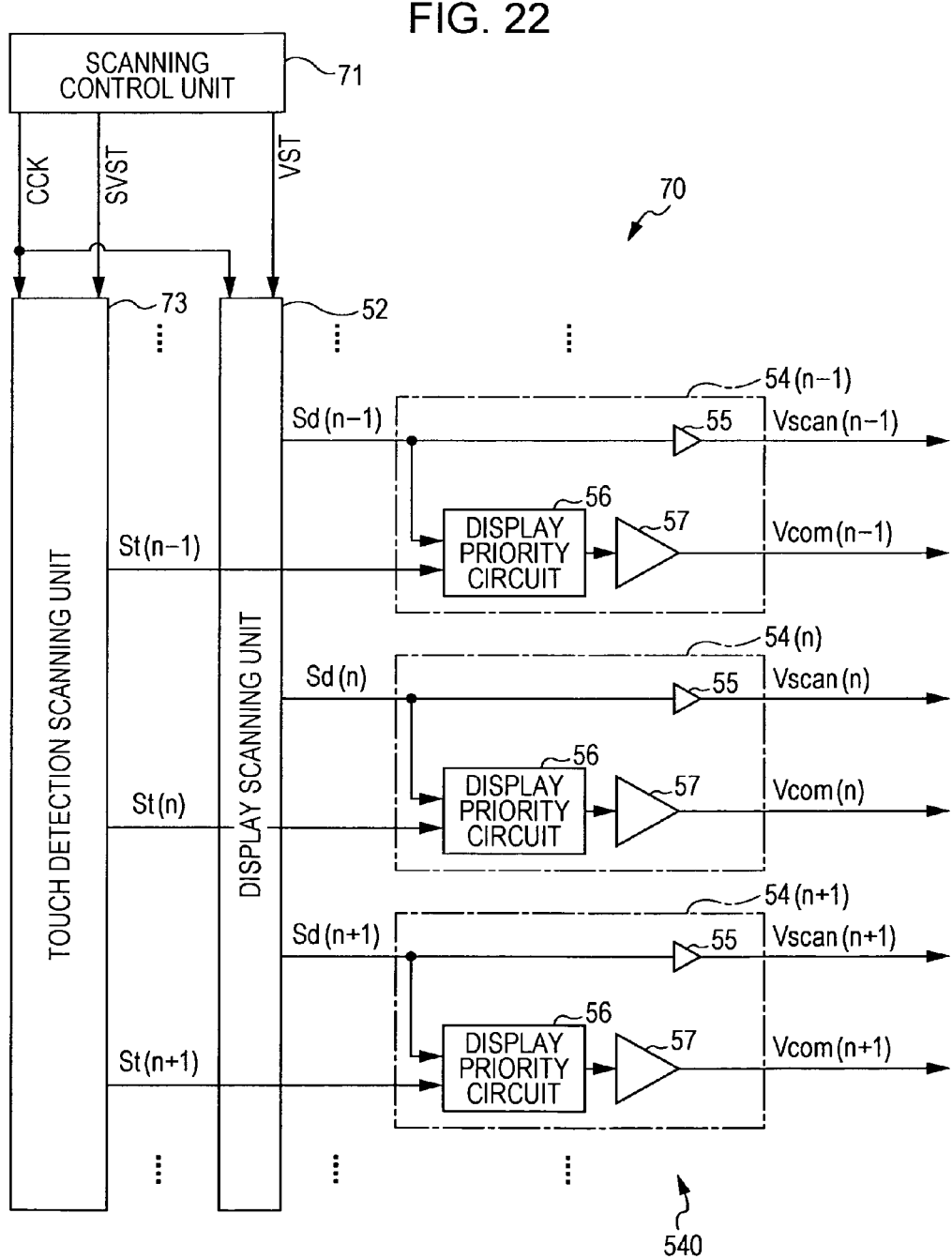
FIG. 22 is a block diagram illustrating a configuration example of a scanning driving unit according to a second embodiment.

FIG. 22 shows a configuration example of the scanning driving unit 70 according to this embodiment. The scanning driving unit 70 includes a scanning control unit 71 and a touch detection scanning unit 73.

The scanning control unit 71 respectively supplies control signals to the display scanning unit 52 and the touch detection scanning unit 73 based on the control signals (not shown) supplied from the controller 11. Specifically, the scanning control unit 71 supplies a clock signal CCK and a control signal VST to the display scanning unit 52, and supplies the clock signal CCK which is the same as supplied to the display scanning unit 52 and a control signal SVST to the touch detection scanning unit 73.

The touch detection scanning unit 73 realizes the waveforms shown in FIGS. 14A to 15F, which are realized by the touch detection scanning unit 53 according to the first embodiment, with a simpler configuration. In other words, although the touch detection scanning unit 53 according to the first embodiment adjusts the touch detection characteristic by changing the clock signal SCCK, the touch detection scanning unit 73 according to this embodiment realizes a simple circuit configuration instead of the degree of adjustment freedom.

Figure 23:
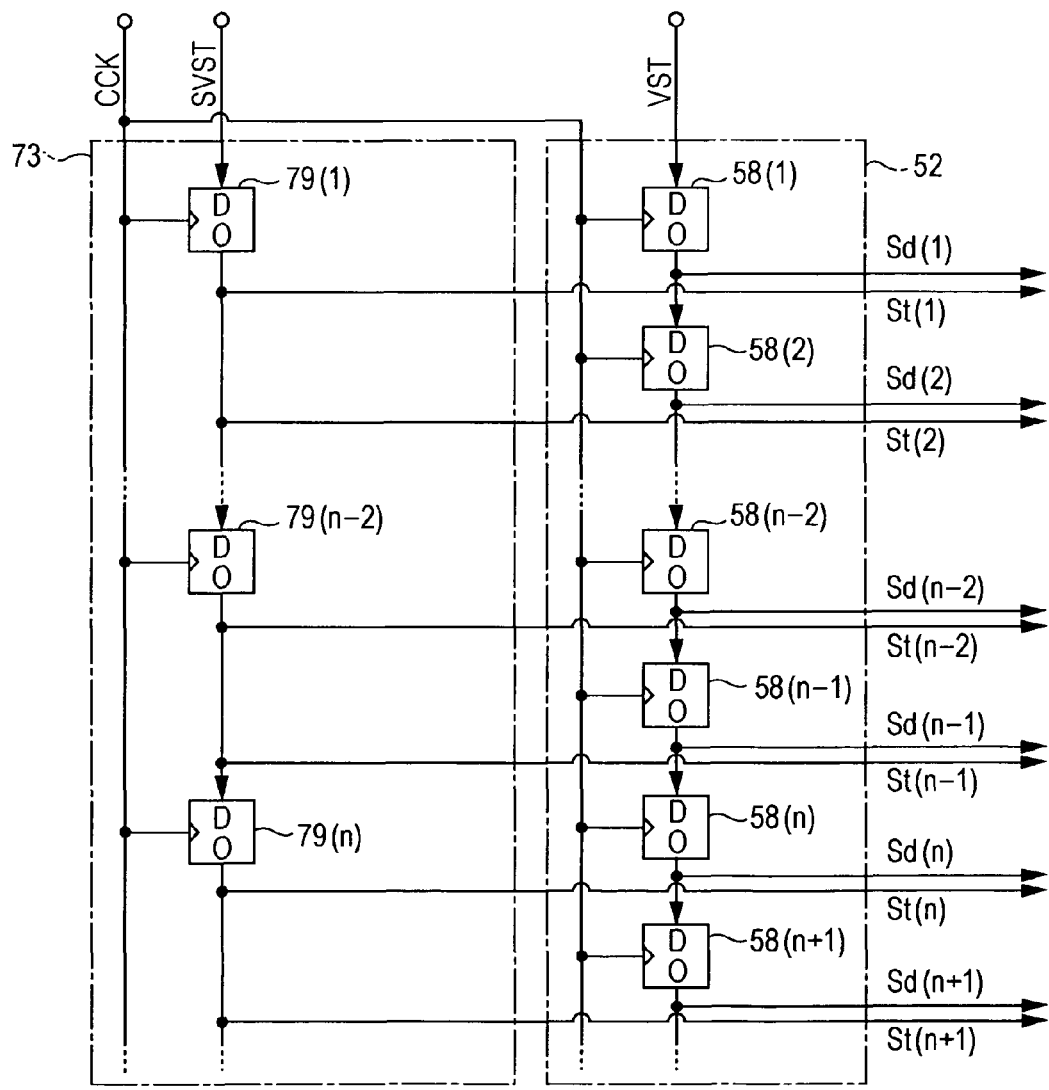
FIG. 23 is a circuit diagram illustrating a configuration example of a display scanning unit and a touch detection scanning unit according to the second embodiment.

FIG. 23 shows a configuration example of the touch detection scanning unit 73 along with the display scanning unit 52. The touch detection scanning unit 73 includes a shift register and generates signals St for selecting the driving electrodes COML which sequentially apply the touch detection driving signal Vcomt. Specifically, the touch detection scanning unit 73 generates a plurality of signals St corresponding to the respective driving electrodes COML based on the clock signal CCK and the control signals SVST supplied from the scanning control unit 71.

The touch detection scanning unit 73 includes a plurality of flip-flops 79. The flip-flops 79 are connected in series and form a shift register. Clock terminals of the flip-flops 79 are supplied with the clock signal CCK supplied from the scanning control unit 71, and an input terminal D of the first stage flip-flop 79(1) of the shift register is supplied with the control signal SVST supplied from the scanning control unit 71. Each of the flip-flops 79 supplies a signal output from the output terminal O thereof to the input terminal D of the next stage flip-flop 79 and also supplies the signal to the driving unit 54 as the signal St. At this time, each of the flip-flops 79 supplies the signal St to two driving units 54. Specifically, for example, the flip-flop 79(n), as shown in FIGS. 22 and 23, supplies the output signal therefrom to the n-th driving unit 54(n) as the signal St(n), and also supplies the output signal to the (n+1)-th driving unit 54(n +1) as the signal St(n+1).

Since each of the flip-flops 79 supplies the signals St to two driving units 54, the length of the shift register of the touch detection scanning unit 73 is a half the length of the touch detection scanning unit 53 according to the first embodiment. In addition, since the shift register is operated using the clock signal CCK, the latches 60, which are necessary for outputting the signals St in synchronization with the clock signal CCK in the touch detection scanning unit 53 according to the first embodiment, can be omitted in the touch detection scanning unit 73.

Figures 24A, 24B, 24C:
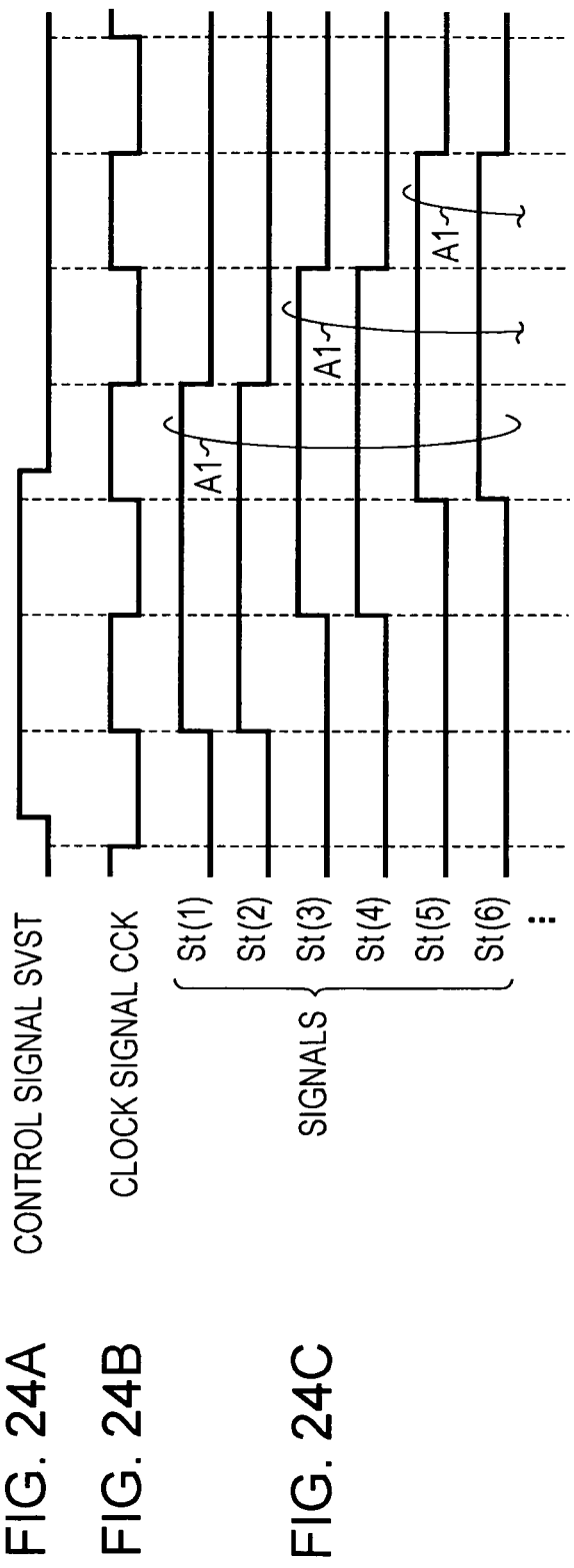
FIGS. 24A to 24C are timing waveform diagrams illustrating an operation example of the touch detection scanning unit according to the second embodiment.

FIGS. 24A to 24C show an operation example of the touch detection scanning unit 73, wherein the FIG. 24A shows a waveform of the control signal SVST; FIG. 24B shows a waveform of the clock signal CCK; and FIG. 24C shows waveforms of the signals St.

The scanning control unit 71 supplies the control signal SVST having the pulse width corresponding to three times of the half cycle of the clock signal CCK to the touch detection scanning unit 73 (FIG. 24A). The shift register including the flip-flops 79 performs serial parallel conversion for the control signal SVST based on the clock signal CCK. Each of the flip-flops 79 supplies the signal St to two driving units 54. Specifically, for example, the flip-flop 79(1) outputs the output signal therefrom as the signals St(1) and St(2), and the flip-flop 79(2) outputs the output signal therefrom as the signals St(3) and St(4) (FIG. 24C). Thereby, the signals St(3) and St(4) are delayed by one cycle of the clock signal CCK with respect to the signals St(1) and St(2). As such, all the flip-flops 79 in the shift register are operated in the same manner, and thus the pulse of the control signal SVST sequentially appears in the signals St by being transmitted in the shift register.

In this example, the control signal SVST has the pulse width corresponding to three times of the half cycle of the clock signal CCK, and thus the pulse having the pulse width appears in each signal St (FIG. 24C). Each of the flip-flops 79 supplies the signal St to the two driving units 54, and thus two signals St (for example, the signal St(1) and the signal St(2)) are output at the same timing (FIG. 24C). In other words, the touch detection scanning unit 73 is operated such that six (=3×2) signals St have the high level at the same time (the waveforms A1), and the signals St having the high level are shifted by two every half cycle of the clock signal CCK. In other words, the touch detection scanning unit 73 realizes the waveforms St shown in FIG. 14F which are realized by the touch detection scanning unit 53 according to the first embodiment.

FIGS. 25A to 25C show another operation example of the touch detection scanning unit 73, wherein the FIG. 25A shows a waveform of the control signal SVST; FIG. 25B shows a waveform of the clock signal CCK; and FIG. 25C shows waveforms of the signals St. Although the control signal SVST has the pulse width corresponding to three times of the half cycle of the clock signal CCK in the example shown in FIGS. 24A to 24C, the control signal SVST has the pulse width corresponding to four times of the half cycle of the clock signal CCK in the example shown in FIGS. 25A to 25C.

In this example, since the control signal SVST has the pulse width corresponding to four times of the half cycle of the clock signal CCK, the pulse having the pulse width appears in each of the signals St (FIG. 25C). Each of the flip-flops 79 supplies the signal St to the two driving units 54, and thus two signals St (for example, the signal St(1) and the signal St(2)) are output at the same timing (FIG. 25C). In other words, the touch detection scanning unit 73 is operated such that eight (=4×2) signals St have the high level at the same time (the waveforms A2), and the signals St having the high level are shifted by two every half cycle of the clock signal CCK. In other words, the touch detection scanning unit 73 realizes the waveforms St shown in FIG. 15F which are realized by the touch detection scanning unit 53 according to the first embodiment.

As described above, in this embodiment, in the case where the driving electrodes COML which are targets of the touch detection driving are shifted by two, the number of the flip-flops 79 of the touch detection scanning unit 73 is reduced to a half of the flip-flops 58 of the display scanning unit 52, and each of the flip-flops 79 supplies the signal St to the two driving units, thereby realizing the touch detection scanning unit with a simpler configuration. Other effects are the same as in the case of the above-described first embodiment.

In the above-described embodiment, the number of the flip-flops 79 of the touch detection scanning unit 73 is reduced to a half of the flip-flops 58 of the display scanning unit 52, but the present disclosure is not limited thereto. For example, when the number of the flip-flops 79 of the touch detection scanning unit is reduced to a third of the flip-flops 58 of the display scanning unit 52, and each of the flip-flops 79 supplies the signal St to three driving units, the driving electrodes COML which are targets of the touch detection driving may be shifted by three. As such, it is possible to change the speed of the touch detection scanning by changing a ratio of the number of the flip-flops 79 of the touch detection scanning unit 73 and the number of the flip-flops 58 of the display scanning unit 52.

4. Application Examples

Next, application examples of the touch detecting function display apparatus described in the embodiments and the modified example will be described with reference to FIGS. 26 to 30G. The touch detecting function display apparatus according to the embodiments and the like is applicable to all fields of electronic equipment such as television sets, digital cameras, notebook type personal computers, portable terminals such as mobile phones, or video cameras. In other words, the touch detecting function display apparatus according to the embodiments and the like is applicable to all the fields of electronic equipment which displays video signals input from an external device or video signals generated therein as images or videos.

Application Example 1

Figure 26:
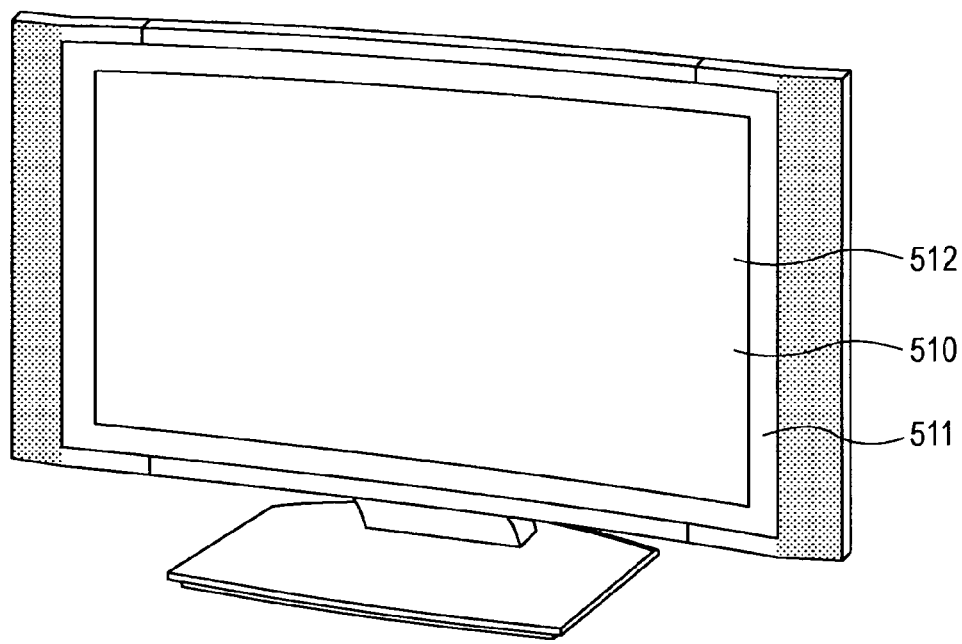
FIG. 26 is a perspective view illustrating an exterior configuration of an application example 1 of the touch detecting function display apparatus according to the embodiment.

FIG. 26 is an exterior view of a television set to which the touch detecting function display apparatus according to the embodiments and the like is applied. The television set has, for example, a video display screen portion 510 including a front panel 511 and filter glass 512, and the video display screen portion 510 is constituted by the touch detecting function display apparatus according to the embodiments and the like.

Application Example 2

Figure 27A:
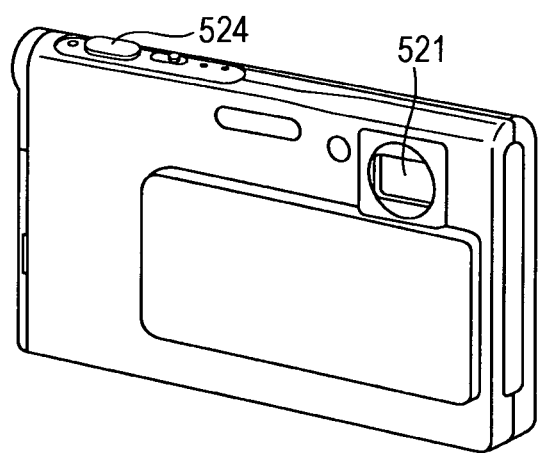
FIGS. 27A and 27B are perspective views illustrating an exterior configuration of an application example 2.
Figure 27B:
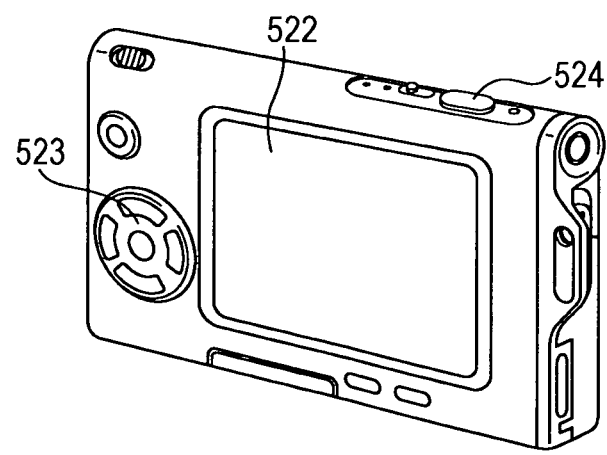

FIGS. 27A and 27B are exterior views of a digital camera to which the touch detecting function display apparatus according to the embodiments and the like is applied. The digital camera has, for example, a light emission portion 521 for flash, a display portion 522, a menu switch button 523, and a shutter button 524, and the display portion 522 is constituted by the touch detecting function display apparatus according to the embodiments and the like.

Application Example 3

Figure 28:
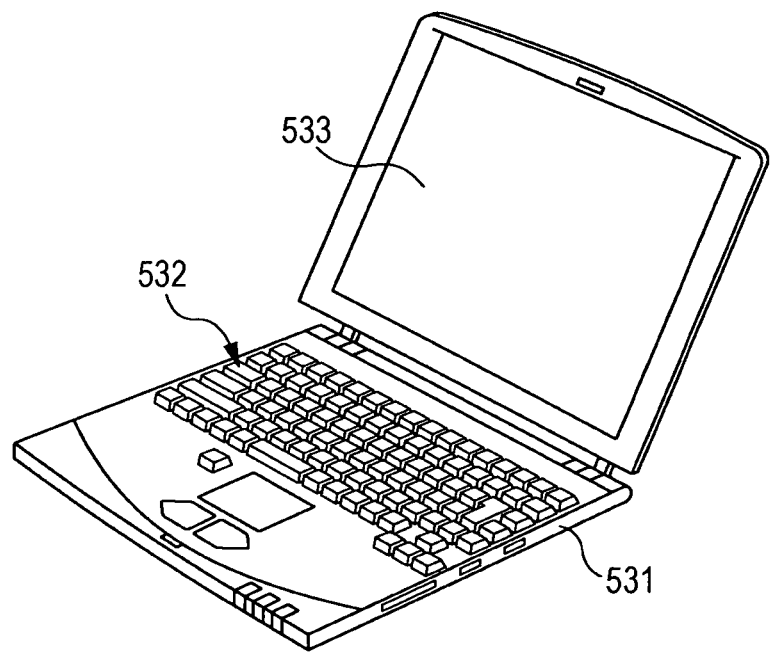
FIG. 28 is a perspective view illustrating an exterior configuration of an application example 3.

FIG. 28 is an exterior view of a notebook type personal computer to which the touch detecting function display apparatus according to the embodiments and the like is applied. The notebook type personal computer has, for example, a main body 531, a keyboard 532 for an input operation of characters or the like, and a display portion 533 displaying images, and the display portion 533 is constituted by the touch detecting function display apparatus according to the embodiments and the like.

Application Example 4

Figure 29:
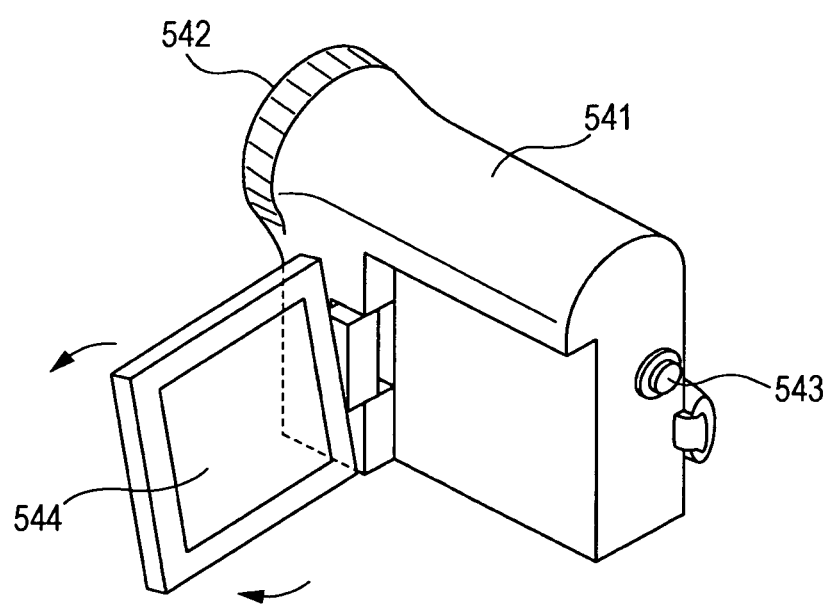
FIG. 29 is a perspective view illustrating an exterior configuration of an application example 4.

FIG. 29 is an exterior view of a video camera to which the touch detecting function display apparatus according to the embodiments and the like is applied. The video camera has, for example, a main body portion 541, a lens 542 used to photograph subjects and installed in the front lateral side of the main body portion 541, a start and stop switch button 543 used for photographing, and a display portion 544. The display portion 544 is constituted by the touch detecting function display apparatus according to the embodiments and the like.

Application Example 5

FIGS. 30A to 30G are exterior views of a mobile phone to which the touch detecting function display apparatus according to the embodiments and the like is applied. The mobile phone is formed by connecting, for example, an upper case 710 to a lower case 720 using a connection portion (hinge portion) 730, and has a display 740, a sub-display 750, a picture light 760, and a camera 770. The display 740 or the sub-display 750 is constituted by the touch detecting function display apparatus according to the embodiments and the like.

As above, the present disclosure has been described using several embodiments and modified examples, and the application examples to the electronic equipment, the present disclosure is not limited to the embodiments but may have various modifications.

Figure 31:
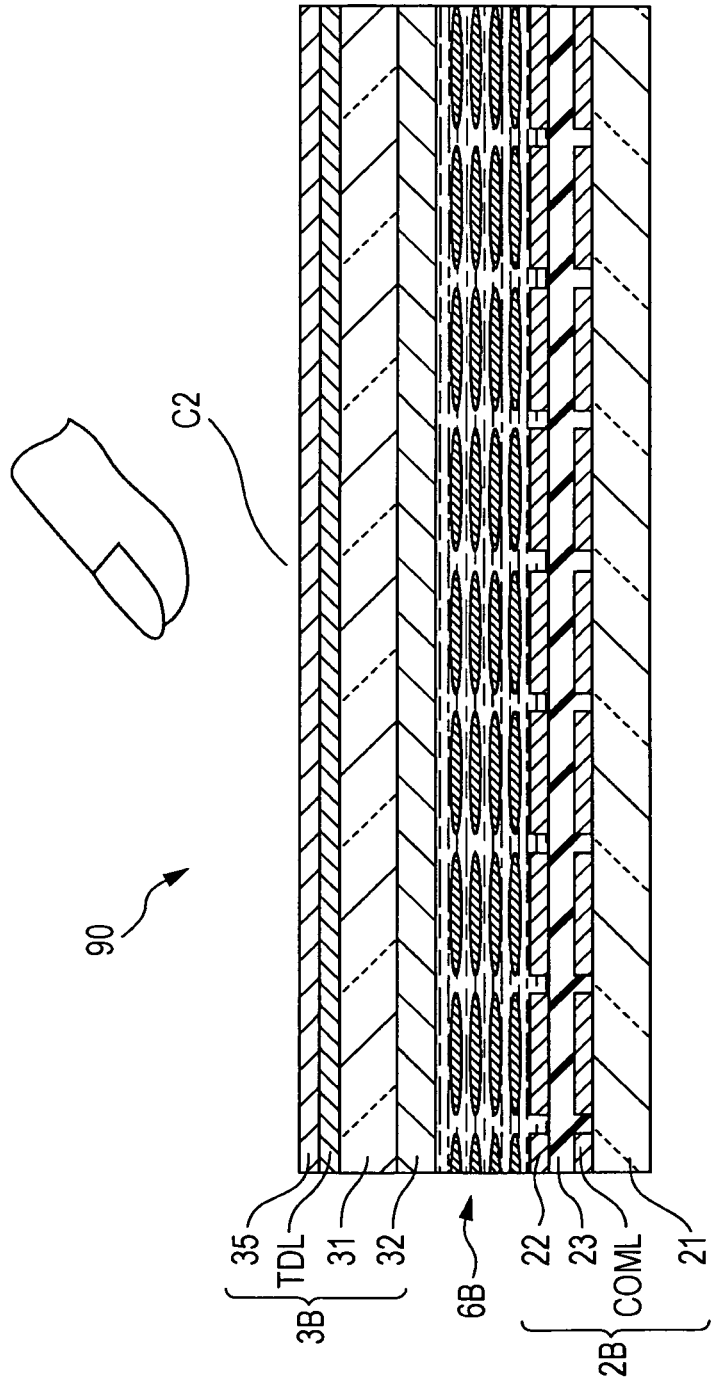
FIG. 31 is a cross-sectional view illustrating a schematic cross-sectional structure of a touch detecting function display device according to a modified example of the respective embodiments.

In the respective embodiments and the like, although the touch detecting function display device 10 is formed by integrating the liquid crystal display device 20 using various kinds of modes of liquid crystal such as TN, VA, and ECB, with the touch detection device 30, instead thereof, a liquid crystal display device using liquid crystal of a transverse electric field mode such as FFS (Fringe Field Switching) or IPS (In-Plane Switching) may be integrated with the touch detection device. For example, in a case of using the liquid crystal of the transverse electric field mode, a touch detecting function display device 90 may be configured as shown in FIG. 31. This figure shows an example of a cross-sectional structure of main parts of the touch detecting function display device 90, and shows a state where a liquid crystal layer 6B is interposed between a pixel substrate 2B and an opposite substrate 3B. The names or functions of the remaining parts are the same as in the case of FIG. 5, and thus the description thereof will be omitted. In this example, unlike the case of FIG. 5, the driving electrodes COML commonly used for both the display and the touch detection are formed directly on the TFT substrate 21 and forms a part of the pixel substrate 2B. The pixel electrodes 22 are disposed over the driving electrodes COML via an insulating layer 23. In this case, all the dielectric bodies including the liquid crystal layer 6B between the driving electrodes COML and the touch detection electrodes TDL contribute to forming the capacitor C1.

The present disclosure contains subject matter related to that disclosed in Japanese Priority Patent Application JP 2010-186198 filed in the Japan Patent Office on Aug. 23, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch detecting function display apparatus comprising:
  a plurality of common driving electrodes that are disposed in parallel so as to extend in one direction;
  a display element that performs display based on a pixel signal and a display driving signal;
  a touch detection element that detects an external approaching object based on a touch detection driving signal; and
  a scanning driving unit that performs first scanning driving for sequentially applying the display driving signal to the plurality of common driving electrodes in a time division manner and second scanning driving for sequentially applying the touch detection driving signal to the plurality of common driving electrodes in a time division manner,
  wherein the scanning driving unit performs the second scanning driving at a scanning speed higher than that of the first scanning driving, and simultaneously selects two or more common driving electrodes as targets of the second scanning driving,
  wherein when the two or more common driving electrodes selected as targets of the second scanning driving includes a common driving electrode that overlaps with a common driving electrode selected as a target of the first scanning driving, the scanning driving unit applies the display driving signal to the overlapping common driving electrode, and applies the touch detection driving signal to common driving electrodes other than the overlapping common driving electrode among the two or more common driving electrodes selected as targets of the second scanning driving,
  wherein the scanning driving unit includes a plurality of output circuits, a scanning control unit, a shift register unit, and a timing adjustment unit, the plurality of output circuits respectively corresponding to the plurality of common driving electrodes,
  wherein each of the plurality of output circuits outputs the display driving signal or the touch detection driving signal to a corresponding common driving electrode based on a first output signal that includes a pulse indicating a period for outputting the display driving signal and a second output signal that includes a pulse indicating a period for outputting the touch detection driving signal, and outputs the display driving signal to the corresponding common driving electrode based on the first output signal in an overlap period during which a period of the pulse of the first output signal and a period of the pulse of the second output signal are overlapped,
  wherein the scanning control unit outputs a control signal having a pulse with a pulse width which is M times a scanning pitch period, and a clock signal having N transitions during the scanning pitch period,
  wherein the shift register unit performs serial parallel conversion on the control signal based on the clock signal to generate a plurality of parallel output signals having a pulse with a pulse width corresponding to the pulse width of the pulse of the control signal,
  wherein the timing adjustment unit adjusts each output timing of the parallel output signals generated through the serial parallel conversion such that (1) the pulses of the parallel output signals are output at a timing corresponding to a start timing of the scanning pitch period, (2) the pulses of N parallel output signals are simultaneously output to N output circuits corresponding to N common driving electrodes adjacent to each other, and (3) start timings of the pulses of the parallel output signals are shifted by the scanning pitch period such that the shift increases by one scanning pitch period for each subsequent N common driving electrodes, and
  wherein the timing adjustment unit outputs each adjusted parallel output signal as the second output signal.

2. The touch detecting function display apparatus according to claim 1, wherein the display driving signal is a rectangular wave signal, and
  wherein the second scanning driving is operated based on a basic operation clock having the same frequency as a basic operation clock of the first scanning driving.

3. The touch detecting function display apparatus according to claim 2, wherein the touch detection driving signal is a rectangular wave signal having amplitude larger than that of the display driving signal.

4. A display apparatus comprising:
  a plurality of common driving electrodes;
  a display element that performs display based on a display driving signal;
  a detection element that performs detection based on a detection driving signal; and
  a scanning driving unit that performs first scanning driving for applying the display driving signal to the plurality of common driving electrodes and second scanning driving for applying the detection driving signal to the plurality of common driving electrodes at a scanning speed different from that of the first scanning driving, wherein the scanning driving unit simultaneously selects two or more common driving electrodes as targets of the second scanning driving, wherein when the two or more common driving electrodes selected as targets of the second scanning driving includes a common driving electrode that overlaps with a common driving electrode selected as a target of the first scanning driving, the scanning driving unit applies the display driving signal to the overlapping common driving electrode, and applies the touch detection driving signal to common driving electrodes other than the overlapping common driving electrode among the two or more common driving electrodes selected as targets of the second scanning driving, wherein the scanning driving unit includes a plurality of output circuits, a scanning control unit, a shift register unit, and a timing adjustment unit, the plurality of output circuits respectively corresponding to the plurality of common driving electrodes, wherein each of the plurality of output circuits outputs the display driving signal or the touch detection driving signal to a corresponding common driving electrode based on a first output signal that includes a pulse indicating a period for outputting the display driving signal and a second output signal that includes a pulse indicating a period for outputting the touch detection driving signal, and outputs the display driving signal to the corresponding common driving electrode based on the first output signal in an overlap period during which a period of the pulse of the first output signal and a period of the pulse of the second output signal are overlapped, wherein the scanning control unit outputs a control signal having a pulse with a pulse width which is M times a scanning pitch period, and a clock signal having N transitions during the scanning pitch period, wherein the shift register unit performs serial parallel conversion on the control signal based on the clock signal to generate a plurality of parallel output signals having a pulse with a pulse width corresponding to the pulse width of the pulse of the control signal, wherein the timing adjustment unit adjusts each output timing of the parallel output signals generated through the serial parallel conversion such that (1) the pulses of the parallel output signals are output at a timing corresponding to a start timing of the scanning pitch period, (2) the pulses of N parallel output signals are simultaneously output to N output circuits corresponding to N common driving electrodes adjacent to each other, and (3) start timings of the pulses of the parallel output signals are shifted by the scanning pitch period such that the shift increases by one scanning pitch period for each subsequent N common driving electrodes, and wherein the timing adjustment unit outputs each adjusted parallel output signal as the second output signal.

5. The display apparatus according to claim 4, wherein the scanning driving unit simultaneously selects a plurality of common driving electrodes during the second scanning driving.

6. The display apparatus according to claim 4, wherein the scanning driving unit performs the scanning so as to shift common driving electrodes which are selected by two or more during the second scanning driving.

7. A driving circuit comprising a scanning driving unit that performs first scanning driving for sequentially applying a display driving signal to a plurality of common driving electrodes in a time division manner and second scanning driving for sequentially applying a touch detection driving signal to the plurality of common driving electrodes in a time division manner, for a touch detecting function display unit that includes the plurality of common driving electrodes disposed in parallel so as to extend in one direction; a display element performing a display based on a pixel signal and the display driving signal; and a touch detection element detecting an external approaching object based on the touch detection driving signal, wherein the scanning driving unit performs the second scanning driving at a scanning speed higher than that of the first scanning driving, and simultaneously selects two or more common driving electrodes as targets of the second scanning driving, wherein when the two or more common driving electrodes selected as targets of the second scanning driving includes a common driving electrode that overlaps with a common driving electrode selected as a target of the first scanning driving, the scanning driving unit applies the display driving signal to the overlapping common driving electrode, and applies the touch detection driving signal to common driving electrodes other than the overlapping common driving electrode among the two or more common driving electrodes selected as targets of the second scanning driving, wherein the scanning driving unit includes a plurality of output circuits, a scanning control unit, a shift register unit, and a timing adjustment unit, the plurality of output circuits respectively corresponding to the plurality of common driving electrodes, wherein each of the plurality of output circuits outputs the display driving signal or the touch detection driving signal to a corresponding common driving electrode based on a first output signal that includes a pulse indicating a period for outputting the display driving signal and a second output signal that includes a pulse indicating a period for outputting the touch detection driving signal, and outputs the display driving signal to the corresponding common driving electrode based on the first output signal in an overlap period during which a period of the pulse of the first output signal and a period of the pulse of the second output signal are overlapped, wherein the scanning control unit outputs a control signal having a pulse with a pulse width which is M times a scanning pitch period, and a clock signal having N transitions during the scanning pitch period, wherein the shift register unit performs serial parallel conversion on the control signal based on the clock signal to generate a plurality of parallel output signals having a pulse with a pulse width corresponding to the pulse width of the pulse of the control signal, wherein the timing adjustment unit adjusts each output timing of the parallel output signals generated through the serial parallel conversion such that (1) the pulses of the parallel output signals are output at a timing corresponding to a start timing of the scanning pitch period, (2) the pulses of N parallel output signals are simultaneously output to N output circuits corresponding to N common driving electrodes adjacent to each other, and (3) start timings of the pulses of the parallel output signals are shifted by the scanning pitch period such that the shift increases by one scanning pitch period for each subsequent N common driving electrodes, and wherein the timing adjustment unit outputs each adjusted parallel output signal as the second output signal.

8. A driving method of a touch detecting function display apparatus having a plurality of common driving electrodes and a plurality of output circuits, the plurality of common driving electrodes being disposed in parallel so as to extend in one direction, the plurality of output circuits respectively corresponding to the plurality of common driving electrodes, the driving method comprising:

performing first scanning driving for display based on a pixel signal and a display driving signal by sequentially applying the display driving signal to a plurality of common driving electrodes which are disposed in parallel so as to extend in one direction in a time division manner and sequentially applying the pixel signal to pixel electrodes corresponding to the common driving electrode to which the display driving signal is applied in synchronization with the application of the display driving signal in a time division manner;

performing second scanning driving for sequentially applying a touch detection driving signal used to detect an external approaching object to the plurality of common driving electrodes at a scanning speed higher than that of the first scanning driving in a time division manner;

simultaneously selecting two or more common driving electrodes as targets of the second scanning driving, when the two or more common driving electrodes selected as targets of the second scanning driving includes a common driving electrode that overlaps with a common driving electrode selected as a target of the first scanning driving, applying the display driving signal to the overlapping common driving electrode, and applying the touch detection driving signal to common driving electrodes other than the overlapping common driving electrode among the two or more common driving electrodes selected as targets of the second scanning driving; performing serial parallel conversion on a control signal having a pulse width which is M times a scanning pitch period based on a clock signal having N transitions during the scanning pitch period to generate a plurality of parallel output signals having a pulse with a pulse width corresponding to the pulse width of the pulse of the control signal;

adjusting, each output timing of the parallel output signals generated through the serial parallel conversion such that (1) the pulses of the parallel output signals are output at a timing corresponding to a start timing of the scanning pitch period, (2) the pulses of N parallel output signals are simultaneously output to N output circuits corresponding to N common driving electrodes adjacent to each other, and (3) start timings of the pulses of the parallel output signals are shifted by the scanning pitch period such that the shift increases by one scanning pitch period for each subsequent N common driving electrodes; and outputting each adjusted parallel output signal as the second output signal, wherein each of the plurality of output circuits outputs the display driving signal or the touch detection driving signal to a corresponding common driving electrode based on a first output signal that includes a pulse indicating a period for outputting the display driving signal and a second output signal that includes a pulse indicating a period for outputting the touch detection driving signal, and outputs the display driving signal to the corresponding common driving electrode based on the first output signal in an overlap period during which a period of the pulse of the first output signal and a period of the pulse of the second output signal are overlapped.

9. Electronic equipment comprising:
a touch detecting function display apparatus; and
a control unit that performs an operation control using the touch detecting function display apparatus, wherein the touch detecting function display apparatus includes
a plurality of common driving electrodes that are disposed in parallel so as to extend in one direction;
a display element that performs display based on a pixel signal and a display driving signal;
a touch detection element that detects an external approaching object based on a touch detection driving signal; and
a scanning driving unit that performs first scanning driving for sequentially applying the display driving signal to the plurality of common driving electrodes in a time division manner and second scanning driving for sequentially applying the touch detection driving signal to the plurality of common driving electrodes in a time division manner, wherein the scanning driving unit performs the second scanning driving at a scanning speed higher than that of the first scanning driving, and simultaneously selects two or more common driving electrodes as targets of the second scanning driving, wherein when the two or more common driving electrodes selected as targets of the second scanning driving includes a common driving electrode that overlaps with a common driving electrode selected as a target of the first scanning driving, the scanning driving unit applies the display driving signal to the overlapping common driving electrode, and applies the touch detection driving signal to common driving electrodes other than the overlapping common driving electrode among the two or more common driving electrodes selected as targets of the second scanning driving, wherein the scanning driving unit includes a plurality of output circuits, a scanning control unit, a shift register unit, and a timing adjustment unit, the plurality of output circuits respectively corresponding to the plurality of common driving electrodes, wherein each of the plurality of output circuits outputs the display driving signal or the touch detection driving signal to a corresponding common driving electrode based on a first output signal that includes a pulse indicating a period for outputting the display driving signal and a second output signal that includes a pulse indicating a period for outputting the touch detection driving signal, and outputs the display driving signal to the corresponding common driving electrode based on the first output signal in an overlap period during which a period of the pulse of the first output signal and a period of the pulse of the second output signal are overlapped, wherein the scanning control unit outputs a control signal having a pulse with a pulse width which is M times a scanning pitch period, and a clock signal having N transitions during the scanning pitch period, wherein the shift register unit performs serial parallel conversion on the control signal based on the clock signal to generate a plurality of parallel output signals having a pulse with a pulse width corresponding to the pulse width of the pulse of the control signal, wherein the timing adjustment unit adjusts each output timing of the parallel output signals generated through the serial parallel conversion such that (1) the pulses of the parallel output signals are output at a timing corresponding to a start timing of the scanning pitch period, (2) the pulses of N parallel output signals are simultaneously output to N output circuits corresponding to N common driving electrodes adjacent to each other, and (3) start timings of the pulses of the parallel output signals are shifted by the scanning pitch period such that the shift increases by one scanning pitch period for each subsequent N common driving electrodes, and wherein the timing adjustment unit outputs each adjusted parallel output signal as the second output signal.

* * * * *